United States Patent
Carrier et al.

(10) Patent No.: US 7,928,692 B2
(45) Date of Patent: Apr. 19, 2011

(54) BATTERY PACK FOR CORDLESS POWER TOOLS

(75) Inventors: David A. Carrier, Aberdeen, MD (US); Andrew E. Seman, Jr., White Marsh, MD (US); Geoffrey S. Howard, Columbia, MD (US); Daniele C. Brotto, Baltimore, MD (US); Danh T. Trinh, Parkville, MD (US); Fred S Watts, New Freedom, PA (US); Snehal S. Choksi, Owings Mills, MD (US); Qiang J. Zhang, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 12/775,512

(22) Filed: May 7, 2010

(65) Prior Publication Data

US 2010/0213900 A1 Aug. 26, 2010

Related U.S. Application Data

(62) Division of application No. 11/552,832, filed on Nov. 20, 2006, now Pat. No. 7,728,553.

(60) Provisional application No. 60/730,872, filed on Oct. 28, 2005.

(51) Int. Cl.
*H02J 7/00* (2006.01)
*H02J 7/04* (2006.01)

(52) U.S. Cl. ........ 320/119; 320/116; 320/124; 320/134; 320/136

(58) Field of Classification Search .................. 320/134, 320/114, 119, 115, 124, 135, 136, 137, 117, 320/116, 127, 161, 162
See application file for complete search history.

(56) References Cited

U.S. PATENT DOCUMENTS

| | | | |
|---|---|---|---|
| 6,288,522 B1 * | 9/2001 | Odaohhara et al. | 320/138 |
| 7,394,222 B2 | 7/2008 | Hashimoto et al. | |
| 7,471,063 B2 * | 12/2008 | Zick et al. | 320/114 |
| 2002/0036841 A1 | 3/2002 | Nomura et al. | |
| 2002/0195994 A1 | 12/2002 | Perelle | |
| 2003/0155892 A1 * | 8/2003 | Poletti | 320/137 |
| 2004/0036446 A1 | 2/2004 | Iwashima | |
| 2004/0239287 A1 * | 12/2004 | Batts-Gowins | 320/103 |
| 2005/0212481 A1 | 9/2005 | Nakada | |
| 2005/0248318 A1 | 11/2005 | Denning | |
| 2006/0091858 A1 | 5/2006 | Johnson et al. | |
| 2006/0244420 A1 | 11/2006 | Stanesti et al. | |
| 2007/0103173 A1 | 5/2007 | Cranford, Jr. et al. | |
| 2007/0108941 A1 | 5/2007 | Sainomoto et al. | |
| 2007/0108944 A1 * | 5/2007 | Pellenc | 320/130 |

FOREIGN PATENT DOCUMENTS

WO 2005/038952 4/2005
WO 2006/041751 4/2006

* cited by examiner

*Primary Examiner* — Edward Tso
*Assistant Examiner* — Alexis Boateng
(74) *Attorney, Agent, or Firm* — Harness, Dickey & Pierce, P.L.C.

(57) ABSTRACT

A battery pack which includes a battery pack electronic control circuit adapted to control an attached power tool and/or an attached charger. The battery pack includes additional protection circuits, methodologies and devices to protect against fault conditions within the pack, as the pack is operatively attached to and providing power to the power tool, and/or as they pack is operatively attached to and being charged by the charger.

18 Claims, 12 Drawing Sheets

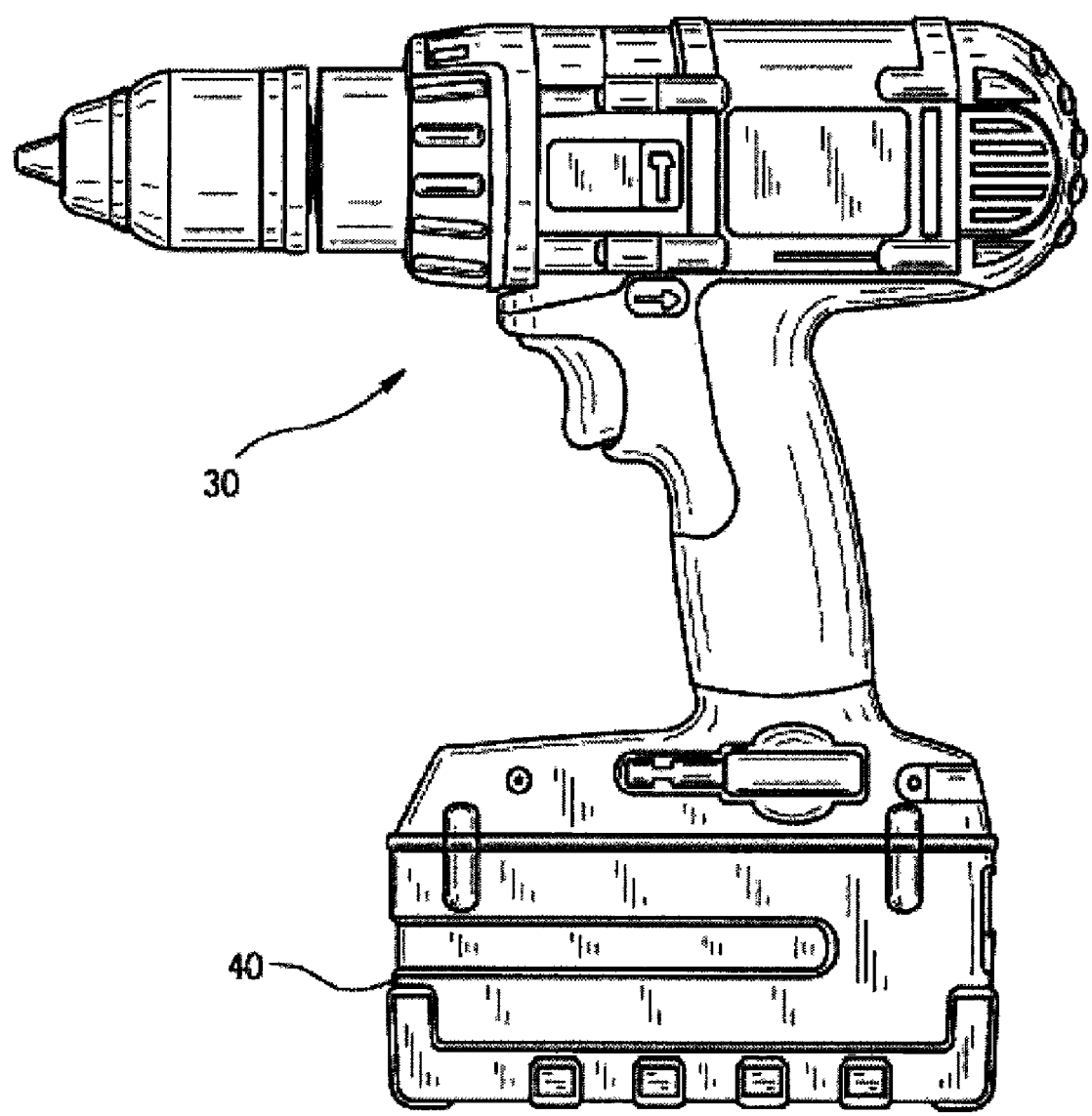

BATTERY PACK FOR CORDLESS POWER TOOLS

CROSS-REFERENCE TO RELATED APPLICATIONS

This application is a divisional of U.S. patent application Ser. No. 11/552,832 filed on Nov. 20, 2006, which claims the benefit of U.S. Provisional Application No. 60/730,872 filed on Oct. 28, 2005. The entire disclosures of each of the above applications are incorporated herein by reference.

FIELD

Example embodiments in general relate to a battery pack configured for powering cordless power tools and/or power tool systems including a tool and charger.

DESCRIPTION OF RELATED ART

Over the past few years, lithium-ion (Li-ion) batteries have begun replacing nickel-cadmium (NiCd), nickel-metal-hydride (NiMH), and lead-acid batteries in low-voltage, portable electronic devices such as notebook-type personal computers. As compared to NiCd and NiMH batteries, Li-ion batteries are lighter but have a larger capacity per unit volume. For this reason, Li-ion batteries have been typically suitable to low-voltage devices that are preferably light and which are required to endure continuous use for a long time. In an overdischarged state, however, Li-ion batteries deteriorate rapidly, thus Li-ion batteries require over-discharge protection. long time. In an overdischarged state, however, Li-ion batteries deteriorate rapidly, thus Li-ion batteries require over-discharge protection.

Conventional protections for Li-ion battery packs have been designed primarily for low-voltage portable electronic devices such as notebook-type personal computers, cellular phones etc., which require voltage generally on the order of 2 to 4 volts. Such devices are characterized by using battery packs composed of cells (such as Li-ion, NiCd, NiMH cells) that provide a maximum output voltage of about 4.2 volts/cell. For Li-ion battery cells, care must be taken to prevent damage from electrical and mechanical stresses, since lithium is a highly reactive substance.

However, much higher voltages (e.g., 18V or higher) are typically required for cordless power tools. However, above 18V tool systems, the overall weight of a cordless power tool using conventional NiCd or NiMH battery packs begins to become prohibitive. In other words, with NiCd and NiMH cordless power sources, higher power means substantially heavier battery packs. The corresponding increase in overall weight of the cordless tool makes the tool more difficult to manipulate and/or use over extended periods. For example, the weight of a 24 volt NiCd battery pack (about 3.3 lbs) represents over a 100 percent increase in weight as compared to the weight of a 12 volt NiCd battery pack (1.5 lbs).

Accordingly, battery packs based on a Li-ion or other lithium based chemistries are being developed for cordless power tools in order to provide higher voltage outputs than conventional NiCd and NiMH battery packs (and substantially higher power than conventional Li-ion packs used for PCs and cell phones), but at a reduced weight (as compared to conventional NiCd or NiMH battery packs used as power sources in conventional cordless power tools). A feature of these battery packs is that these packs may exhibit substantially lower impedance characteristics as compared to conventional NiCd, NiMH and/or even the lower power Li-ion battery packs.

The introduction of lower impedance chemistries and construction styles to develop secondary batteries generating substantially higher output voltages (of at least 18 V and up, for example) may possibly create several additional protection issues. Battery packs having lower impedance also means that the pack can supply substantially higher current to an attached electronic component, such as a power tool. As current through a motor of the attached power tool increases, demagnetization forces (e.g., the number of armature turns of the motor times the current, ampere-turns) could substantially increase beyond a desired or design limit in the motor. Such undesirable demagnetization could thus potentially damage the motor.

For example, a lower impedance electrical source could cause damage to a tool's motor when the tool is held at stall condition. During motor stall, the motor and battery impedances are the only mechanisms to limit the current since there is no back-EMF created by the motor. With a lower impedance pack, the currents would be higher. Higher currents through the motor will increase the likelihood of de-magnetization of the permanent magnets within the tool's motor, possible thermal overload, eventual pack and/or tool damage, etc.

Accordingly, additional protection controls may need to be in place to address potential fault conditions (such as overcharge, over-discharge, over-current, over-temperature, cell imbalance, etc.) that could occur in high power Li-ion battery packs adapted for use with cordless power tools and chargers, so as to prevent internal or external damage to the pack, and/or to a connected charger, tool or user in the vicinity of a battery pack connected to a charger or tool.

SUMMARY

Example embodiments are directed to a battery pack for a cordless power tool system. The battery pack includes a battery pack electronic control circuit adapted to control an attached power tool and/or an attached charger. The battery pack may include additional protection circuits, methodologies and devices to protect against fault conditions which occur in the pack, as the pack is operatively attached to an providing power to the power tool, and/or as the pack is operatively attached to and being charged by a charger.

BRIEF DESCRIPTION OF THE DRAWINGS

The example embodiments of the present invention will become more fully understood from the detailed description given herein below and the accompanying drawings, wherein like elements are represented by like reference numerals, which are given by way of illustration only and thus are not limitative of the example embodiments of the present invention.

FIGS. 9-11 illustrate example cordless power tools of a cordless power tool system in accordance with the present invention.

DETAILED DESCRIPTION OF THE EXAMPLE EMBODIMENTS

Figure 1A:
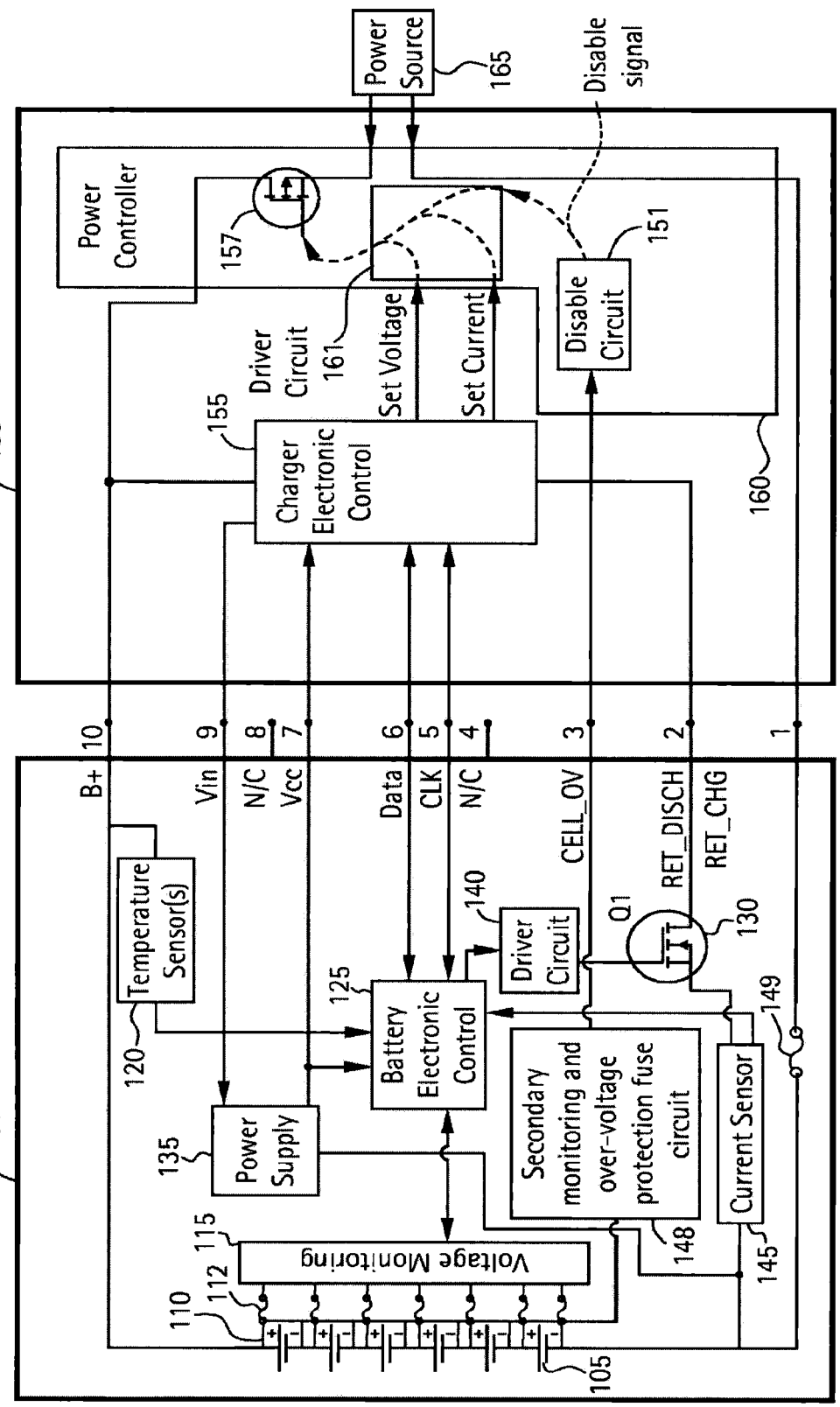
FIG. 1A is a block diagram illustrating internal electronic components and connections between an example battery pack and an example battery charger in accordance with an example embodiment of the present invention.

With general reference to the drawings, a system of cordless power tools constructed in accordance with the teachings of example embodiments of the present invention is illustrated. Example cordless power

DETAILED DESCRIPTION OF THE EXAMPLE EMBODIMENTS

With general reference to the drawings, a system of cordless power tools constructed in accordance with the teachings of example embodiments of the present invention is illustrated. Example cordless power tools of the system are shown to include, by way of examples only, a circular power saw 10 (FIG. 9), a reciprocating saw 20 (FIG. 10) and a drill 30 (FIG. 11). The tools 10, 20 and 30 each may include a conventional DC motor (not shown) adapted to be powered by a power source having a given nominal voltage rating.

Tools 10, 20 and 30 may be driven by a removable power source having a nominal voltage rating of at least 18 volts. It will become evident to those skilled that the present invention is not limited to the particular types of tools shown in the drawings nor to specific voltages. In this regard, the teachings of the present invention may be applicable to virtually any type of cordless power tool and any supply voltage.

Figure 9:
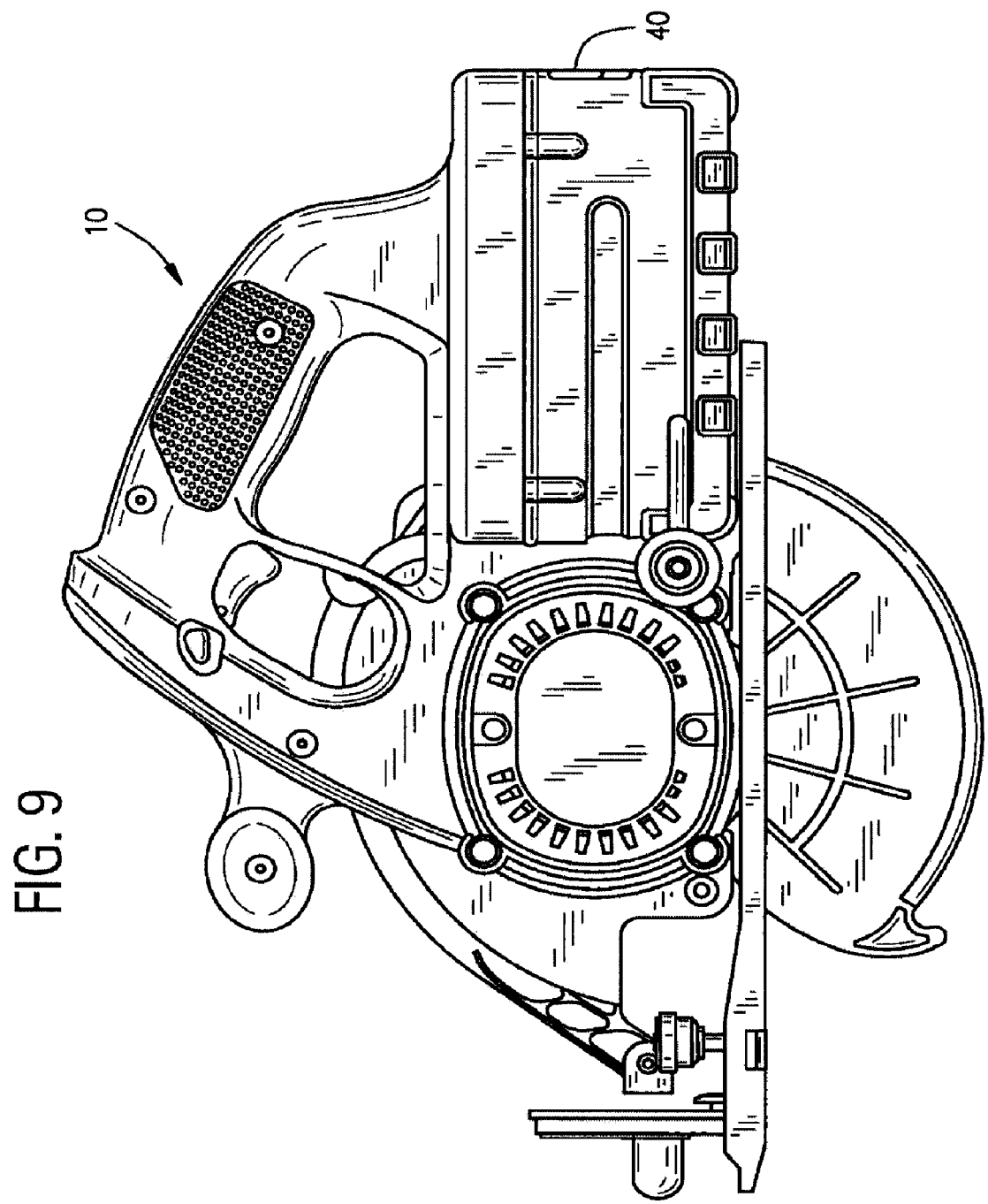
Figure 10:
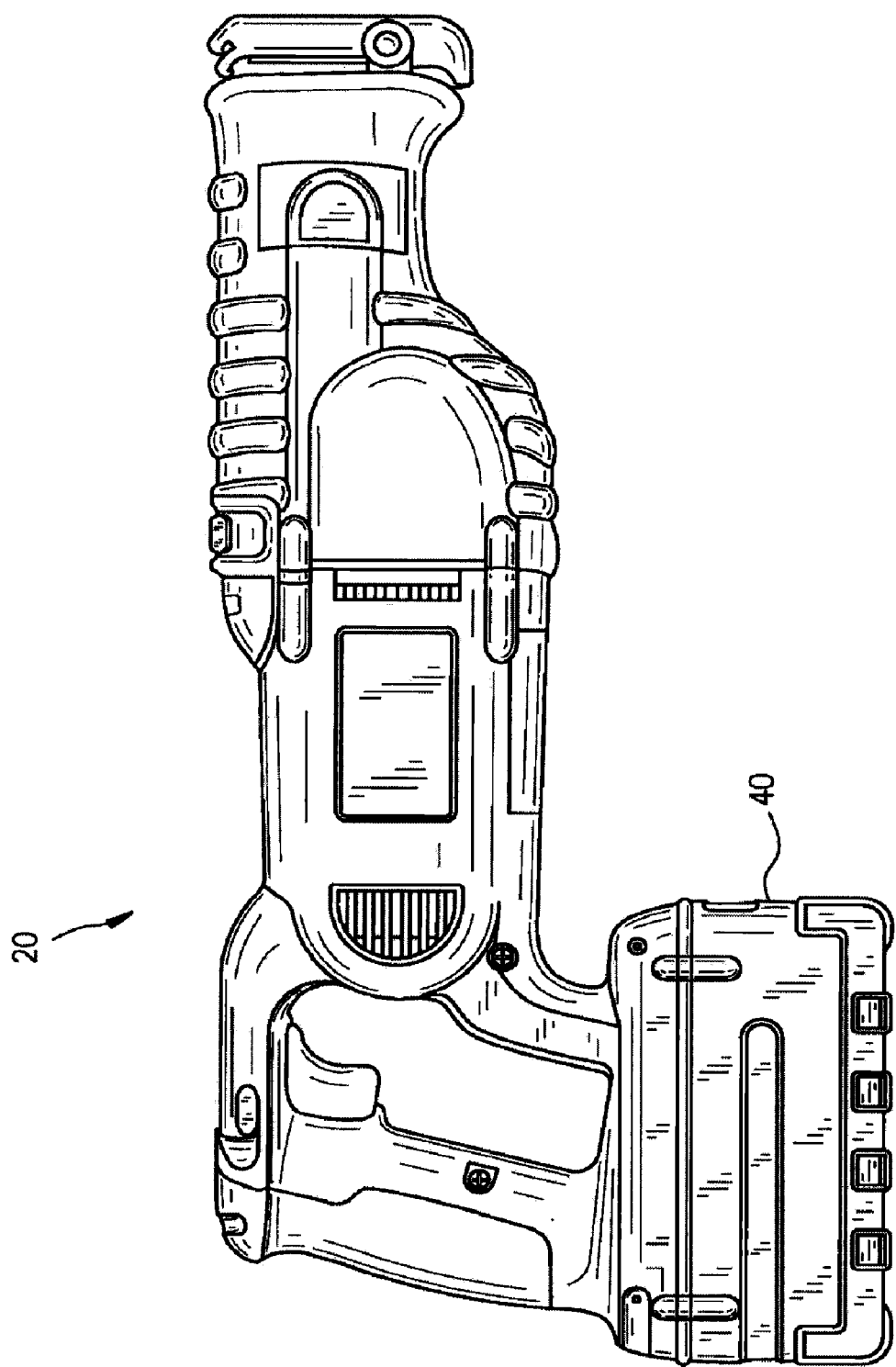

With continued reference to the drawings, the removable power source which may be embodied as a battery pack 40. In the example embodiments illustrated, the battery pack may be a rechargeable battery pack 40. As shown in FIGS. 9-11, battery pack 40 includes a housing. The housing contains a plurality of battery cells (not shown) connected in series therein and/or a plurality of serially-connected strings of cells, in which the strings are in parallel with one another.

For purposes of describing example embodiments of the present invention, the cells within the housing of battery pack 40 have a lithium-ion cell chemistry. As the example embodiments are directed to the cordless power tool environment, which requires power sources having much higher voltage ratings than conventional low voltage devices using Li-ion battery technology, (such as laptop computers and cellular phones) the nominal voltage rating of the battery pack 40 is at least 18V.

However, pack 40 may be composed of cells of another lithium-based chemistry, such as lithium metal or lithium polymer, or other chemistry such as nickel cadmium (NiCd), nickel metal hydride (NiMH) and lead-acid, for example, in terms of the chemistry makeup of individual cells, electrodes and electrolyte of the pack 40.

Figure 1B:
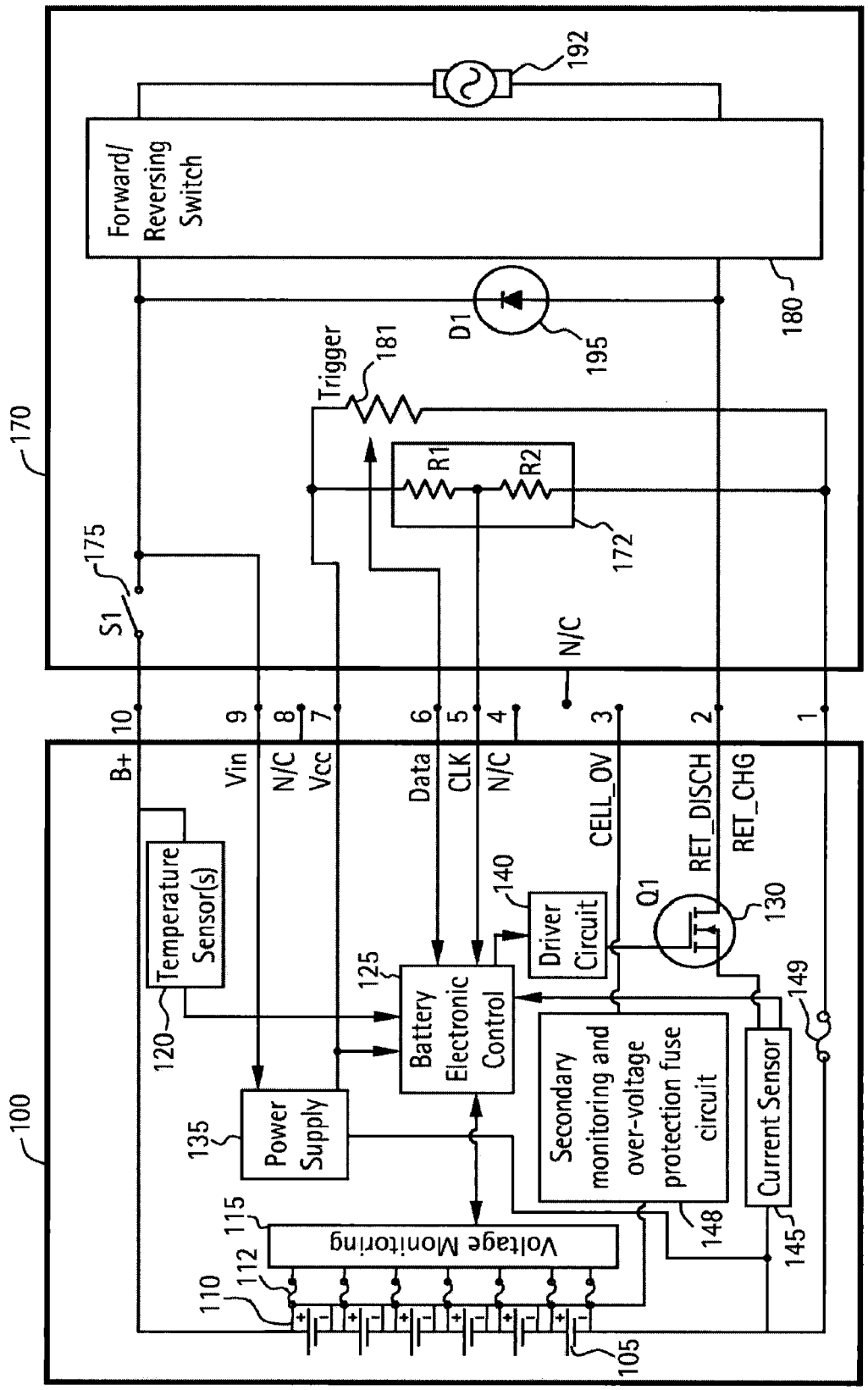
FIG. 1B is a block diagram illustrating internal electronic components and connections between an example battery pack and an example power tool in accordance with an example embodiment of the present invention.

FIG. 1A is a block diagram illustrating internal electronic components and connections between an example battery pack and an example battery charger in accordance with an example embodiment of the present invention; FIG. 1B is a block diagram illustrating internal electronic components and connections between an example battery pack and an example power tool in accordance with an example embodiment of the present invention.

Referring to FIG. 1A, battery pack 100 may include a plurality of battery cells 105 connected in series (six shown for simplicity, pack 100 could include more or less than six cells or may be composed of serial strings of cells with the serial strings in parallel with each other). For purposes of describing the example embodiments, battery pack 100 may be composed of cells with a lithium-ion cell chemistry, and corresponds to the removable battery pack 40 having a housing with cells therein in each of FIGS. 9-11.

The Li-ion cells 105 may have one or more of a lithium metal oxide cell chemistry, a lithium metal phosphate cell chemistry of an olivine structure and/or another lithium-based chemistry makeup, for example, in terms of the active components in the positive electrode (cathode) material. As examples, the active material in the cathode of the cell with a Li-metal oxide chemistry may be one of lithiated cobalt oxide, lithiated nickel oxide, lithiated manganese oxide spinel, and mixtures of same or other lithiated metal oxides. The active component in the cathode of a cell having a lithium metal phosphate chemistry may be a lithiated metal phosphate, such as lithium-iron phosphate (LFP), lithium manganese phosphate, lithium vanadium phosphate, lithium cobalt phosphate, lithium nickel phosphate, or any mixtures of same, all of the olivine structure. In a specific example, the cells 105 of pack 100 have a LPF cell chemistry, in terms of the active components in the positive electrode (cathode) material. Pack 100 may further be composed of cells of another lithium-based chemistry other than Li-metal oxide or Li-metal phosphate, such as a lithium metal or lithium polymer chemistry, or other chemistry such as nickel cadmium (NiCd), nickel metal hydride (NiMH) and lead-acid, for example, in terms of the makeup of active material in the individual cells, electrodes and/or electrolyte of the pack 100.

These cells may be cylindrically shaped and have a spiral wound or "jelly roll" construction as to the cathode, separators and anode, as is known in the battery cell art. The material of the negative electrode may be a graphitic carbon material on a copper collector or other known anode material, as is known in the Li-ion battery cell art.

As the example embodiments are directed to the cordless power tool environment, which requires much higher voltage ratings than conventional devices using Li-ion battery technology, the nominal voltage rating of the battery pack 100 is at least 18V. In an example, the cells 105 within battery pack 100 could be configured to have a nominal voltage rating in a range between 18 to 36 volts. In on example, pack 100 includes 10 (ten) 26650 Li-ion cells (each cell 26 mm in diameter and 65 mm in length) having a nominal cell voltage of approximately 3.6 V/cell for a nominal voltage of 36V. The 26650 cells may have a Li-ion oxide or phosphate cell chemistry as described above. Alternatively, the cell arrangement within pack 100 may comprise twenty (20) 18650 Li-ion cells with a lithium metal phosphate or Li-metal oxide cell chemistry (each cell 18 mm in diameter and 65 mm in length), such as three strings of cells which in a parallel combination have a nominal cell voltage of about 3.6 V/cell, so as to achieve a pack voltage of 36V. The pack voltage is approximately 36 V, as volts per cell may vary due to specific chemistry of the lithium-ion based pack. For example, a cell having a lithium iron phosphate (LFP) based-cell chemistry is about 3.3 V/cell nominally, where a cell having a lithium metal oxide based cell chemistry is about 3.6 V/cell nominally.

In another example, pack 100 can comprise seven (7) 26650 Li-ion (oxide-based) or Li-ion (phosphate based) cells to provide a pack having a nominal voltage rating of about 25 V (about 3.6 V/cell). In another example, pack 100 may comprise fourteen (14) 18650 Li-ion (oxide-based) or Li-ion (phosphate based) cells in a serial-parallel arrangement to achieve approximately 25V. Volts per cell and the number of cells may be tailored to the desired total power required of the high power Li-ion battery pack, and may be in a nominal voltage range of about 3.3 to 4.6 V/cell, which may present an acceptable range based on industry electrochemical voltage potential guidelines. Of course these values may vary depending on the charge state of the cells (whether cells are fully charged or not), and on the particular chemistry of the cells. The above cell configurations are illustrated and described in detail in FIGS. 7A to 8B of co-pending and commonly-assigned U.S. patent application Ser. No. 11/266,242, filed Nov. 5, 2005 to Daniele C. Brotto and entitled "ERGONOMICALLY EFFICIENT CORDLESS POWER TOOL", the relevant description describing these cell configurations being hereby incorporated by reference herein.

Thus, battery pack 100 in FIG. 1A (and in FIG. 1B) is applicable to and/or designed for cordless power tool systems comprising at least a cordless power tool, the battery pack and a charger. Pack 100 may be understood as a removable power source for high-power, power tool operations, and is removably attachable to a cordless power tool or charger as known in the art. As previously noted, battery pack 100 has a nominal voltage rating of at least 18 volts and/or has a maximum power output of at least about 385 Watts. However, it should be evident to those skilled in the art that the battery pack 40/100 is not necessarily limited to the particular types of tools as shown in FIGS. 9-11, nor to the specific voltage ratings and/or power output specifications described above.

In FIG. 1A, ten terminal connections (terminals 1-10) are shown. However, the example embodiments should not be limited to this terminal configuration, as more or less terminals could be included depending on the desired information passed between, or parameters monitored by, the pack 100 or charger 150.

A battery electronic control unit 125 is responsible for the protection of the cells 105 for any fault condition exposed on the terminals (via charger 150, an attached tool, and/or due to user tampering). The battery electronic control unit 125 may be powered by an internal power supply 135 as shown.

The battery electronic control unit 125 may be embodied in hardware or software as a digital microcontroller, a microprocessor or an analog circuit, a digital signal processor or by one or more digital ICs such as application specific integrated circuits (ASICs), for example. The battery electronic control unit 125 may include various types of memory that may execute one or more software or firmware programs. Example memory includes RAM, FLASH and EEPROM. As an example, RAM may be used to store program variables during run time. As an example, FLASH memory may be used to store program code and calibration values. EEPROM may also be provided to store calibration values, data logging information, error codes, etc.

The discharge current of pack 100 is clamped or discontinued by the use of semiconductor device 130 (discharge FET) under the control of battery electronic control unit 125 so as to control current to the tool motor 190. The battery electronic control unit 125 can be powered by an internal power supply 135 as shown, and controls the ON/OFF state of discharge FET 130 through a driver circuit 140. In general, the battery electronic control unit 125 controls the switching of discharge FET 130 via the driver circuit 140 so as to selectively control the average voltage applied to the tool motor 190, thus controlling at least one of power and current output from the battery pack 100.

The charging of battery cells 105 is controllable by the battery electronic control unit 125 communicating over data lines to the charger 150. By placing the charge FET 157 within the charger 150 instead of within pack 100, both space and power dissipation (heat) is moved from the compact battery pack 100 to the charger 150.

Battery pack 100 may further include a current sensor 145 which senses current and provides a signal to battery electronic control unit 125. Current sensor 145 may be embodied by known components for current sensors, such as a shunt resistor, current transformer, etc. which may provide a signal representing sensed current in pack 100 to battery electronic control unit 125.

Pack 100 includes voltage monitoring circuitry to monitor voltage of the cells, such as voltage monitoring unit 115. An example is described as a battery monitoring arrangement 200 in detail in co-pending and commonly assigned U.S. patent application Ser. No. 11/239,286 to Carrier et al., filed Sep. 30, 2005 in the U.S. Patent & Trademark Office and entitled "METHOD AND DEVICE FOR MONITORING BATTERY CELLS OF A BATTERY PACK AND METHOD AND ARRANGEMENT FOR BALANCING BATTERY CELL VOLTAGES DURING CHARGE", (hereafter the '286 application) the entire contents of which are hereby incorporated by reference.

The voltage monitoring unit 115 is configured to sense individual cell voltage and sense total pack voltage of the string of cells 105 ('stack voltage') to provide a signal representing the individual cell or stack voltage to battery electronic control unit 125. As described in the '286 application, the voltage monitoring unit 115 is part of an integrated circuit (IC 220 in the '286 application) to take, singly or sequentially, a sampled reading comprising one of an individual cell voltage or a total stage voltage for all cells in the pack. The sampled reading is filtered in the integrated circuit prior to being read by the battery electronic control unit 125 (referred to as a pack microprocessor 250 in the '286 application).

In another example, and as described in the '286 application, the battery electronic control unit 125 directs voltage monitoring unit 115 to periodically measure, throughout the duration of charging, the cell voltage across each cell 105 of the pack 100 and the total pack voltage in a sequential manner. The measured individual cell voltages and a current average cell voltage for all cells are sent by the voltage monitoring unit 115 to the battery electronic control unit 125. The measured total pack voltage is automatically divided by the number of cells within the pack to determine the current average cell voltage. The battery electronic control unit 125 thus may control balancing of each of the cell voltages during the charge based on each measured individual cell voltage and the determined current average cell voltage.

Optionally, the pack 100 may be provided with its own identification (ID), if communicating with another intelligent device such as a charger microprocessor or a tool microprocessor. A pack ID (not shown), if desired, may be embodied by an ID resistor, LED display that displays identification data of the pack, serial identification data sent upon engagement and sensed by the tool/charger via data and clock terminals 5 and 6 for example, and/or a field in an frame of data sent over an air interface to the tool/charger, etc.

The pack 100 may further include one or more temperature sensors 120. Temperature sensor 120 may be embodied as NTC or PTC thermistors, Temperature sensing integrated circuits, or thermocouples. The temperature sensor 120 may communicate the temperature inside the battery pack 100 to intelligence in the battery pack 100 and/or to intelligence in a connected charger 150, for example, via terminal 10 to charger electronic control 155. As the function of such temperature sensors are known, a detailed explanation of functional operation is omitted for purposes of brevity.

Pack 100 may include auxiliary internal protection circuits or devices including a secondary monitoring and over-voltage protection fuse circuit 148 and a charge fuse 149 in the return charge line from charger 150. As to be described in more detail below, the secondary monitoring and over-voltage protection fuse circuit 148 separately monitors the voltage of each cell (in addition to voltage monitoring unit 115) to detect any cell (one or some or all cells) which reaches an over-voltage condition during charge. In such a case, the secondary monitoring and over-voltage protection fuse circuit 148 sends a signal to the charger 150 to generate a disable signal in the charger 150 to terminate charge current. This provides independent backup protection in case the cell balancing functionality within the voltage monitoring unit 115 becomes corrupted during charge and/or the voltage monitoring unit 115 becomes inoperative.

The charge fuse 149 acts as a tertiary protection device to blow in the case that both cell balancing (voltage monitoring unit 115) and secondary overvoltage protection measures from circuit 148 become inoperative and/or fail to detect a cell over-voltage condition for whatever reason. Once charge fuse 149 blows, charge and discharge is permanently disabled within pack 100.

When battery pack 100 is connected to charger 150, a charger electronic control unit 155 in the charger 150 may be powered from the battery's internal power supply 135 through terminal 9. This is only an example connection scheme, as other means for powering the charger electronic control unit 155 can be employed. The charger 150 could have its own supply or derive it directly from the battery voltage. The charger electronic control unit 155 may also be embodied in hardware or software as a digital microcontroller, microprocessor, analog circuit, digital signal processor, or by one or more digital ICs such as application specific integrated circuits (ASICs), for example. The charger electronic control unit 155 may drive a power controller 160 with a set voltage and a set current to deliver the desired voltage and current from a power source 165 to the battery pack 100 via terminals 1 and 10.

Battery data, charger data and control information can be exchanged through serial data paths on terminals 5 and 6. For example, terminals 5 and 6 could be used to provide charger ID data and other information to the battery electronic control unit 125. Such information can include, but is not limited to, the digital ID of the charger, the charger current, total stack voltage of the cells as read by the charger, temperature conditions of the charger, AC mains level of the charger 150, etc. In an example, any problem the charger 150 senses during its diagnostic testing can be communicated to the battery electronic control unit 125 through serial data paths on terminals 5 and 6. In another example, if the battery electronic control unit 125 receives a charger fault such as low AC mains, the battery electronic control unit 125 can generate an error message to the charger 150 and/or wait before resuming charging, for example. Moreover, based on the fault information and Charger ID data, the battery electronic control unit 125 can control the charger output and/or control charging decisions for its cells based on the charger data. Commands to the charger 150 then may be issued.

FIG. 1B is a block diagram illustrating components and connections between an example battery pack and an example power tool in accordance with an example embodiment of the present invention. FIG. 1B is merely an example circuit configuration and is provided as a context for more clearly describing the various protection methods, circuits and devices in accordance with the example embodiments. The battery pack and tool configuration of FIG. 1B may be applicable to the example cordless tool systems, and equivalents, in any of FIGS. 9-11.

In general, during discharge to provide power to the tool motor 190, the battery electronic control unit 125 may output pulse width modulation (PWM) control signals to drive the driver circuit 140. For example, a pulsing semiconductor (pulse width modulator (PWM)) is commonly used in the electronics industry to create an average voltage that is proportional to the duty cycle. PWM is modulation in which the duration of pulses is varied in accordance with some characteristic of the modulating signal. Alternatively pulse frequency modulation could be used to create this average voltage. In either case, discharge FET 130 may be switched between ON and OFF states to create an average voltage that is proportional to the duty cycle at which it is switched.

During discharge to the power tool 170, the driver circuit 140 level shifts the PWM output of battery electronic control unit 125 to drive the gate of discharge FET 130, cycling discharge FET 130 on and off depending on sensed conditions. The component arrangement that comprises driver circuit 140 is known in the art and is not described herein for reasons of brevity.

The block diagram in FIG. 1B illustrates a general circuit within a standard power tool 170 (such as any of the tools shown in FIGS. 9-11) without an intelligent device such as a tool electronic control, it being understood that pack 100 could communicate with a smart tool having an associated tool electronic control via terminals 5 and 6. Tool 170 has an on/off (power) switch 175, a forward/reversing switch 180 and includes a trigger 181 configured as a potentiometer and connected to one of terminals 1 and 7 in FIG. 1B. The battery electronic control unit 125 may recognize the lack of serial data communications in tool 170 and perform an analog analysis of the voltage at terminals 5 and/or 6. In an example, the analysis may include reading an analog trigger signal representing a degree of trigger 181 retraction by a user for example, as is known. Based on the trigger signal value, the battery electronic control unit 125 sends PWM control signals via driver circuit 140 to cause discharge FET 130 to switch at the desired duty cycle, so as to create a desired (or ordered) motor speed.

Trigger 181 actuation may also provide power to the battery electronic control unit 125 in battery pack 100. The pack electronics are disabled (OFF), as the pack 100 is inserted into the tool 170. As trigger 181 is actuated, switch 175 closes so that power from the cells 105 flows out terminal 10 of the pack 100 into terminal 1 of the tool 170, through switch 175 and pack through terminal 2 of the tool into terminal 9 of the pack 100 as Vin to the battery electronic control unit 125.

Battery pack 100 can receive tool information from a tool ID 172 within the power tool 170. As shown, tool ID 172 is configured as a voltage divider (R1 and R2) which provides a voltage value back to the battery electronic control unit 125 representing an ID value of the tool that is recognized by the battery electronic control unit 125. Each tool may have a different ID value. The ID value may inform the battery electronic control unit 125 as to the power, voltage and/or current limits of the attached tool 170, so that the battery electronic control unit 125 may control the output voltage accordingly. If the tool 170 was a smart tool having its own microprocessor, this information could be passed as serial data via terminals 5 and 6 to the battery electronic control unit 125.

Referring to FIGS. 1A and 1B, each of the sense lines 110 between the cells 105 and the voltage monitoring unit 115 includes a fuse 112 for redundant protection against faults in the pack 100. Current leaves the top cell 105 and flows to the voltage monitoring unit 115, which is part of an electronics module PCB (not shown) containing various protection and control circuitry within pack 100. The current flows through the switch 175 to the tool motor 190. When the discharge FET 130 is on, the current flows back into a module PCB (not shown) of the pack 100 and to the negative side of the cells 105.

The wires connecting the cells have a third leg (sense wires 110) that connect back to the voltage monitoring unit 115 on the module PCB. In these sense wires 110, no high current is expected as these wires 110 are used solely to ascertain the individual cell voltages. Static protection diodes (not shown) are used to prevent damage in the controller by shunting any electrostatic discharge spikes to the high current lines where the spikes can be handled more easily.

The energy of all the cells 105 is concentrated in a small area on the module PCB within the pack 100 such that if a component failure occurred, there could be disturbing results. If, for example, the wire connecting the high side of the battery cells 105 were to fail in the open state while the discharge FET 130 was on, current could flow though one or more static protection diodes on the PCB module back to the switch 175 and motor 190. Since the wires connecting the cells 105 are smaller, these wires could overheat with excessive motor current.

Still further damage could occur as the static protection diodes are not designed to handle motor current. Such a failure could carbonize silicon in the module PCB and cause a short circuit across other components within pack 100. With all the cell connections located in close proximity, failures could cascade across the entire module PCB within the battery pack 100.

Accordingly, by adding an individual fuse 112 in each of the low current sense lines 110, if a high current wire breaks, the current would momentarily flow through a protection diode (not shown) and blow a given fuse 112. Once the fuse 112 has blown, current flow terminates. Because of multiple points of possible wire failure within the pack 100 and therefore multiple current paths, each sense line 110 includes a fuse 112.

In an alternative, the sense lines 110 may contain a fuseable link that blows open with any current flow. Further, connectors for the sense wires 110 could contain the fuses/fuse-able link to save space on the module PCB within the battery pack.

Figure 2:
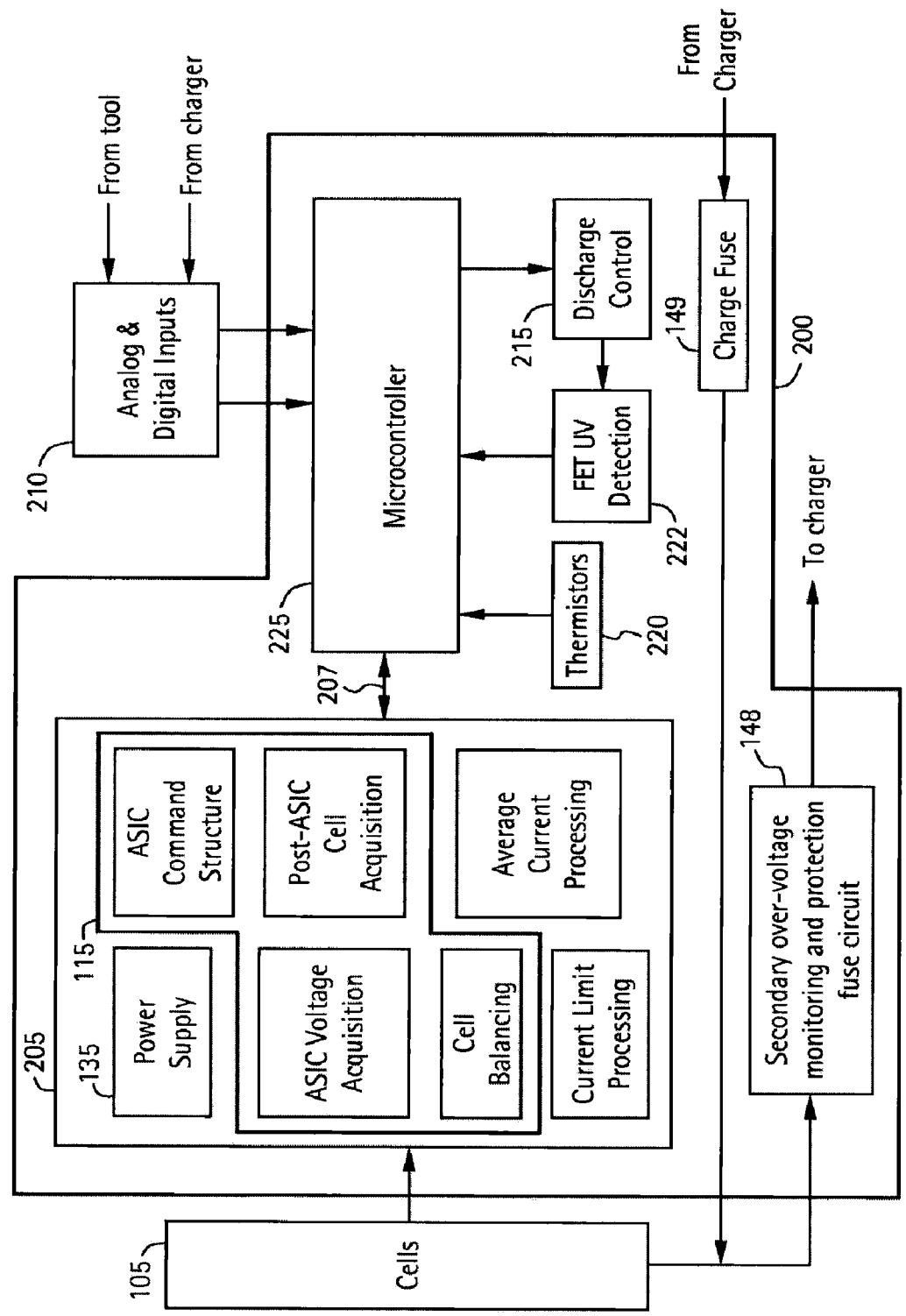
FIG. 2 is a block diagram of an electronics module of the battery pack.

FIG. 2 is a block diagram of an electronics module 200 of the battery pack 100. The electronics module 200 may be separate from the cells 105 within the pack 100 but interconnected to the cells 105 through suitable connectors. In an example, the electronics module 200 is arranged above the cells 105 within an upper part of the housing of the battery pack 100.

The block diagram of the electronics module 200 illustrates a general layout of electronic components and general interrelationship between components in the battery pack 100. In an example, the electronics module 200 has a module printed circuit board (PCB) which includes an integrated circuit (ASIC) 205. ASIC 205 includes the pack power supply 135 that powers a microcontroller 225 (battery electronic control unit 125 in FIGS. 1A/1B) and the voltage monitoring unit 115. The ASIC 205 may include an ASIC command structure, ASIC voltage acquisition, post-ASIC cell acquisition and cell balancing functions, each of which are explained in detail in the '286 application. The ASIC 205 also includes current limit processing circuitry (to be explained in more detail below) and average current processing circuitry.

In general, the average current processing circuitry (which may include current sensor 145) can provide an average current measurement as feedback to the battery pack electronic control unit 125. In FIG. 2, battery pack electronic control unit is embodied as microcontroller 225. Hereafter, battery pack electronic control unit 125 will be referred to as microcontroller 225 for simplicity.

This average current information fed back enables the microcontroller 225 to PWM control the discharge FET 130 so as to change the average voltage that is output from the pack 100. Thus, having measured average pack current values (measured in the discharge return line) fed back to the microcontroller 225 during power tool operation enables the battery pack 100, e.g., microcontroller 225, to control tool motor current.

Serial communications, shown by arrow 207, are possible between the ASIC 205 and microcontroller 225, which is external to ASIC 205 on the module PCB (not shown) of the electronics module 200. Microcontroller 225 is configured to receive analog and/or digital inputs 210 from an attached tool or charger, and temperature information from thermistors 220. Microcontroller 225 can direct various aspects of discharge control (shown generally at block 215) for the pack 100, including control of discharge FET 130. The discharge FET 130 is also within the module 200. Example aspects of discharge control are described in detail in co-pending and commonly assigned U.S. patent application Ser. No. 10/954,222 to Carrier et al., filed Oct. 1, 2004 in the U.S. Patent & Trademark Office and entitled "METHODS OF DISCHARGE CONTROL FOR A BATTERY PACK OF A CORDLESS POWER TOOL SYSTEM, A CORDLESS POWER TOOL SYSTEM AND BATTERY PACK ADAPTED TO PROVIDE OVERDISCHARGE PROTECTION AND DISCHARGE CONTROL", (hereafter the '222 application) the entire contents of which are hereby incorporated by reference herein.

Additionally, the module PCB of the electronics module 200 in pack 100 includes the secondary over-voltage monitoring and protection fuse circuit 148, includes a charge fuse 149 thereon as backup over-charge protection, and further includes FET UV detection circuitry 222 thereon, which is to be described in further detail below. The FET UV detection circuitry 222 checks to see if the FET driving signal from microcontroller 225 for cycling discharge FET 130 is above a sufficient voltage level. This enables a fault FET drive voltage (under-voltage) condition to be detected by the microcontroller so the microcontroller can inhibit discharge FET 130 operation and maintain FET 130 off until the fault is removed.

Current Limit Processing

Figure 3A:
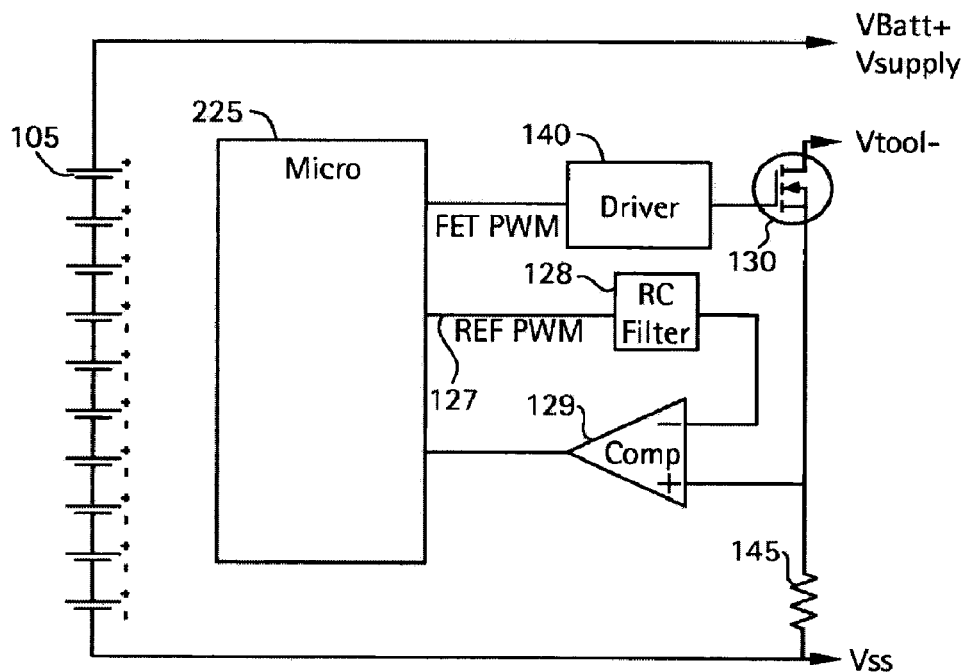
FIG. 3A is simplified view of the battery pack to illustrate a circuit for limiting current in the pack.
Figure 3B:
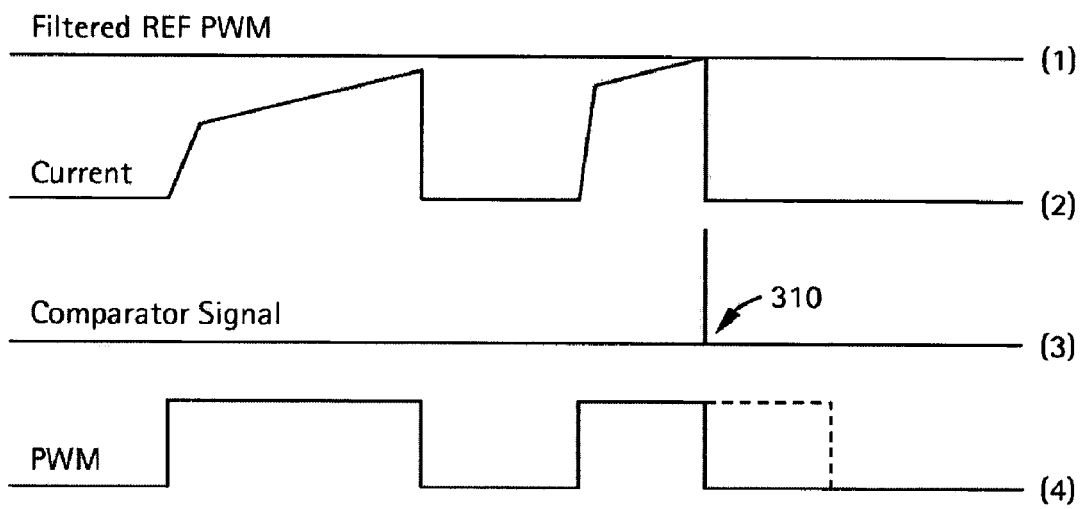
FIG. 3B are timing diagrams for illustrating a current limiting feature in the battery pack that is performed on a cycle-by-cycle basis.

FIG. 3A is simplified view of the battery pack 100 to illustrate a circuit for limiting current in the pack, and FIG. 3B are timing diagrams for illustrating current limit processing in the battery pack that is performed on a cycle-by-cycle basis of the PWIVI waveform, where a cycle can also be understood as a switching period of the FET 130. The current limit in the battery pack 100 limits the instantaneous current, one cannot get more current out of the pack 100 even for transient conditions like "in-rush" of the tool motor 190. The battery pack electronic control unit (microcontroller 225) will set a desired current limit by outputting a PWIVI signal 127 (REF PWIVI) in proportion to the desired current limit. This signal is not the PWIVI signal for the discharge FET 130 (shown as FET PWIVI) that controls motor current. This REF PWIVI signal 127 is reduced by a voltage divider (not shown) and filtered by RC filter 128 to a stable DC voltage and fed as the negative input to a comparator circuit 129 to be used as a reference voltage for the current limit. This stable DC voltage is shown as waveform 1 in FIG. 3B.

When the discharge FET 130 is on, battery voltage is applied to the motor 190 and current increases rapidly. This is shown in waveform 2 in FIG. 3B. The ramp rate is proportional to the voltage applied divided by the inductance of the tool motor 190. The increasing current flows though the discharge FET 130 and across a small resistor (current sensor 145) producing a shunt voltage.

This shunt voltage (representative of the instantaneous current) is fed into the comparator 129 and compared with the filtered REF PWM signal (i.e., the reference voltage signal). As soon as the shunt voltage is equal to or greater than the reference voltage signal (shown by the arrow 310 in waveform 3 in FIG. 3B), the discharge FET 130 is turned off (waveform 4) for the remainder of the switching period (PWM cycle). The comparator 129 output signal to the microcontroller 225 causes what is referred to as an External Interrupt within the microcontroller 225. The External Interrupt turns the FET 130 off regardless of the state of the FET 130 within the switching period. The discharge FET 130 would remain off until the next PWM cycle, e.g., for the remainder of the switching period.

Note that the discharge FET 130 is cycled on and off at a duty cycle determined by the trigger switch 175, but the switching period remains constant. By shortening the ON period of the discharge FET 130 (shown in waveform 4 of FIG. 3B) the duty cycle is essentially reduced, resulting in a lower average output voltage from the battery pack 100 that is applied to the tool motor 190. Therefore, current limit processing and evaluation may be performed on a cycle-by-cycle basis or per switching period basis, i.e., battery pack 100 may include a cycle-bicycle current limiting feature.

Figure 3C:
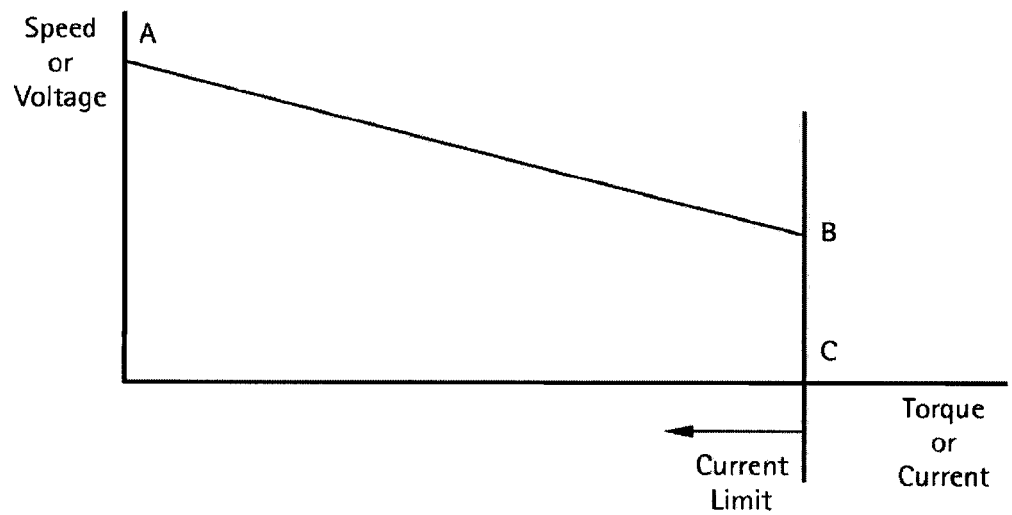
FIG. 3C is a graph to illustrate how power out of the pack is reduced upon reaching a current limit.

FIG. 3C is a graph to illustrate how power out of the pack is reduced upon reaching a current limit. In FIG. 3C, there is shown a graph of speed or voltage versus torque or current, with a vertical line indicating a current limit. Since the microcontroller 225 is always checking the current in the battery cells, should the current reach some given current limit (in an example this current limit could be 40 Amps, or some value less than 40 amps) then the average output voltage of the battery pack 100 is reduced. By lowering the output voltage the demand by the tool motor 190 for current will decrease. This is depicted by the vertical line in the FIG. 3C from point B to point C. Load demands below the current limit show only a voltage drop due to the pack 100 impedance, as shown in the exaggerated graph from point A to point B.

Shorted Tool Test

FIG. 3A may also be referred to for describing a test performed by battery pack 100 to detect a short circuit in an attached tool 170 so as to prevent or avoid battery component failure due to the short. In general, software in the microcontroller 225 can determine a difference between normal in-rush of current from the tool 170 and a short circuit condition in the tool 170. For example, once pack 100 is placed into tool 170 and trigger 181 is initially actuated (pulled), software in microcontroller 225 performs a check to see if a short circuit exists in the power tool 170.

In general, software with microcontroller 225 is designed to perform a 10 microsecond pulse to verify the connected tool is not shorted. During this test, the discharge FET 130 is turned on while the current limit comparator 129 is monitored. If, after 10 microseconds, the FET 130 is still on, then the tool 170 is evaluated as not shorted. On the other hand, if the comparator 129 has tripped e.g., the shunt voltage from current sensor 145 representative of the instantaneous current and fed into the comparator 129 exceeds the filtered reference signal, and hence exceeds the current limit, the power is removed and the pack 100 enters a "Shutdown Mode." The trigger 181 must be re-cycled power to try again.

A requirement for the short tool test is the 10 microsecond pulse. If the tool motor 190 is not shorted, the inductance of the motor 190 prevents the current from increasing to the current limit amps in 10 microseconds even at stall conditions.

Additionally, in an example the current limit can be ignored for the first two microseconds to allow discharge into capacitive loads. A capacitive load will cause a high amount of current for a brief amount of time. If the power tool being operated had a capacitive input, the first inrush of current would exceed the current threshold for less than two microseconds. Then, as the capacitor is charged, the current would fall to zero. By ignoring the inrush period, power tools with capacitive inputs can be operated.

FET UV Detection

Figure 4:
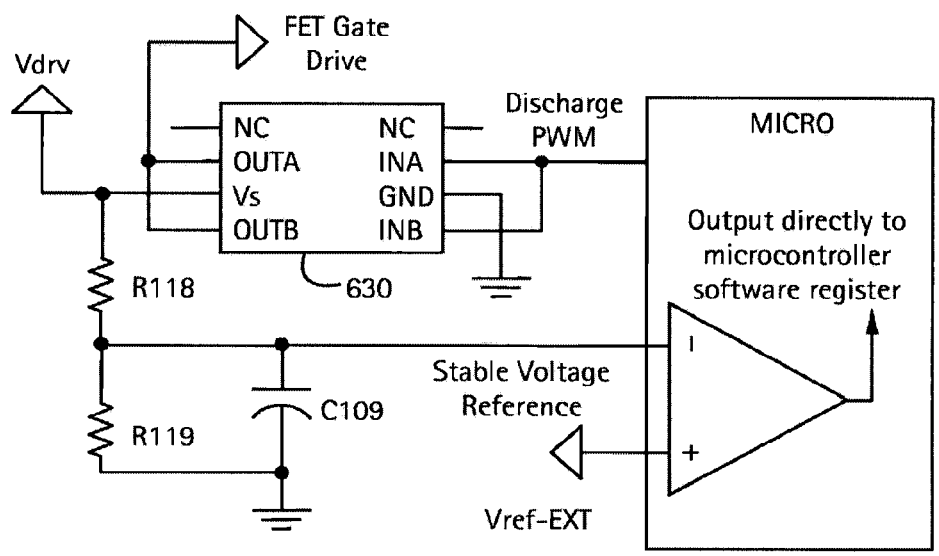

FIG. 4 is a circuit for providing FET under-voltage detection for the voltage which drives the discharge FET 130 in the battery pack 100. The circuit in FIG. 4 is designed to detect a faulty FET drive voltage and inhibit discharge FET operation when necessary. In an example, software in the microcontroller 225 may be configured to monitor various pack 100 parameters at specified intervals (such as 8 ms intervals, although other intervals may be readily apparent to one of ordinary skill in the art). Parameters monitored may include cell voltages, trigger voltage, tool ID, temperatures, etc. These parameters may be periodically checked, with output voltage and current controlled by the duty cycle of the discharge FET 130.

During this monitoring period, the microcontroller 225 also looks at the status of a comparator 410 (built into the microcontroller 225) which is connected to the microcontroller 225 generally as shown in FIG. 4. The supply voltage for the FET driver (Vdrv) is reduced by a voltage divider R118/R119 and filtered to a stable DC voltage and fed as the negative input to comparator 410. If Vdrv drops below critical levels (e.g., less than Vref-EXT), the comparator 410 output will change state, indicating a fault state. In response to this fault state, the microcontroller 225 will inhibit the FET drive (e.g., maintain discharge FET 130 off or turn FET 130 off) and remain in a shutdown state until the next parameter monitoring interval. If the fault is not removed, the discharge FET 130 will remain turned off by the microcontroller 225 and there will be no output voltage on the battery pack. This detection prevents a faulty or weak FET drive signal issued by driver 140 (shown as drive circuit 630 in FIG. 4) from causing the discharge FET 130 to run in linear mode and prevent excessive heating and/or permanent damage to the electronics module in battery pack 100.

Figure 5A:
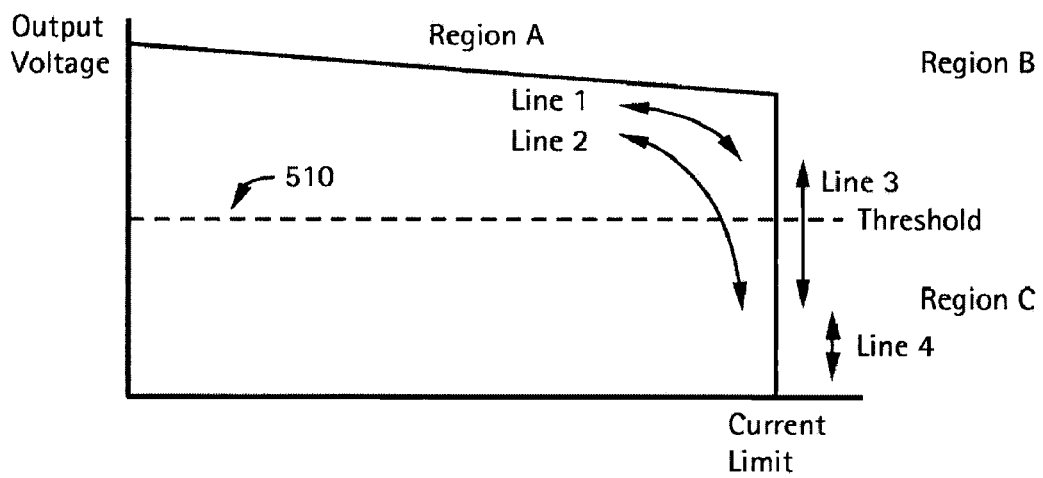
FIG. 5A is a graph of output voltage versus current limit, and FIG. 5B are flow diagrams, each of FIGS. 5A and 5B provided for explaining a method of detecting a stall condition in a cordless power tool system in accordance with an example embodiment of the present invention.
Figure 5B:
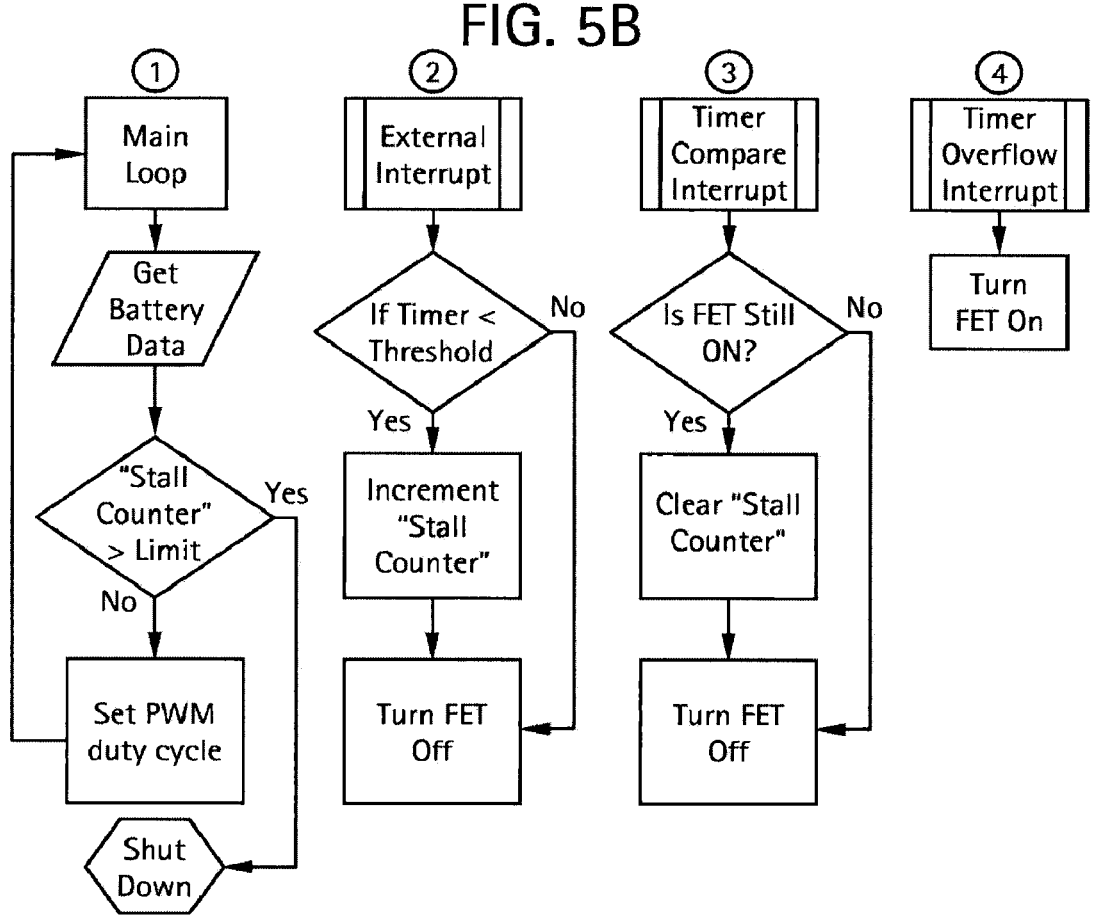

Therefore, by monitoring the FET drive voltage, a reduced voltage (caused by some temporary fault) on the FET driver 630 (140) will not cause the discharge FET 130 to fail because of linear mode operation. This protection may improve system reliability. Additionally, since the comparator 410 is built into the microcontroller 225, any added cost for this protection is minimal Stall Detection FIG. 5A is a graph of output voltage versus current limit, and FIG. 5B are flow diagrams, each of FIGS. 5A and 5B provided for explaining a method of detecting a stall condition in a cordless power tool system in accordance with an example embodiment of the present invention. In particular, the battery pack 100 is configured to detect a condition where the user has intentionally stalled the power tool 170 for an unreasonable period of time, i.e., purposefully.

Referring now to FIG. 5A, when a cordless power tool 170 is operated, the voltage profile of the battery pack 100 may be represented by Region A in the graph of FIG. 5A. Due to the inherent source impedance, as more current is drawn, the output voltage drops slightly. In a system with a current limit, once the load exceeds this limit, the output voltage is forced to zero since no more current can be sourced. This condition is known as a "stall", and is shown by the vertical portion of the graph of FIG. 5A.

In an example, users driving lag screws with a drill/driver will often stall while seating the head of the screw. However, the battery pack electronics herein are configured to detect this stall condition and to limit the amount of time the user can maintain the stall condition.

Referring to FIG. 5A, Region B represents loads slightly higher than the current limit. A circular saw application may require that the user vary from Region A to Region B and back during cutting. By listening for the saw to bog down (Region B), the user instinctively backs off the load and returns to Region A. Continuous operation in Region B is acceptable since actual work is being done. In Region C, however, no work is being done because the output voltage is near zero so the blade is not spinning and only a motor torque is present. This may be desirable for a temporary condition as described earlier but is wasteful and potentially damaging for prolonged periods.

As previously described, the example battery pack 100 employs a discharge FET 130 to control the output voltage of the battery pack. The duty cycle of the discharge FET 130 is directly proportional to the output voltage of the battery pack 100. As previously described, during a PWM cycle or switching period of the FET 130, the discharge FET 130 is turned off as soon as the current, as detected by current sensor 145, reaches the current limit. FIGS. 3A-3C illustrated how a current exceeding the current limit trips a comparator 129, which causes what is referred to as an External Interrupt within the microcontroller 225. The External Interrupt turns the discharge FET 130 off regardless of the state of the discharge FET 130 within the switching period. The discharge FET 130 would remain off until the next PWIVI cycle (switching period).

To create a PWIVI cycle, the microcontroller 225 starts a timer that is automatically incremented with a timer compare register and a timer overflow register (corresponding to the duty cycle and period, respectively.) During a timer overflow event, the PWIVI cycle is ending and a new cycle will start. Data flow 4 in FIG. 5B shows that the FET 130 will be turned on to start the cycle. Once the desired duty cycle is reached, data flow 3 shows that the software in microcontroller 225 will turn discharge FET 130 off until the switching period has ended.

In order to perform stall detection, an External Interrupt pin of microcontroller 225, which is triggered by the circuit in FIG. 3A, would have to check the elapsed time within the PWIVI cycle to determine if the system is operating in Region B or Region C. Referring to FIG. 5B, data flow 2, during an external interrupt (current limit being reached), the PWIVI timer count is compared against a threshold, where the threshold is a count value shown by the horizontal dashed line 510 in FIG. 5A. This count value could be a fixed value or calculated as one-half of a desired timer capture value. If Region C operation as shown in FIG. 5A is detected (above the current limit, and the duty cycle is less than a threshold) a "stall counter" in memory of the microcontroller 225 is incremented by microcontroller 225. In this example, this would be Region C operation, above the current limit, and where the PWIVI timer is less than half the desired duty cycle, e.g., timer<threshold in data flow 2. The stall counter variable could be incremented by a constant value or by a value inversely proportional to the elapsed time within the cycle, for example. The latter might be advantageous in that a "dead" stall would increase faster than an "almost" stall condition. If the interrupt detected a Region B operation, e.g., where the output of the "if timer threshold" decision block in data flow 2 is 'NO', the stall counter would remain unchanged.

At the end of the PWIVI "on" time, FIG. 5B data flow 3 describes how the PWIVI timer in microcontroller 225 generates a Timer Compare Interrupt. This interrupt would normally turn the discharge FET 130 off for the remainder of the PWIVI cycle. If the discharge FET 130 was still on (Region A), this Timer compare interrupt could also clear the stall counter that is incrementing when tool operations are occurring in Regions B & C. If the discharge FET 130 was already off (from Region B & C operation), nothing is done. At the end of the PWIVI timer cycle, see data flow 4 in FIG. 513, a Timer Overflow Interrupt issues, resets the PWIVI timer and enables the discharge FET 130 to start the next PWIVI cycle.

Referring to data flow 1 in FIG. 513, and during a typical or normal motor control algorithm, which operates substantially slower than the external interrupt or timer interrupts, the stall counter may be compared with a threshold or limit. This limit or threshold may be a pre-set value or a function of various battery parameters such as "State of Charge", temperature readings, voltage readings, etc. If the stall counter exceeds the threshold, the microcontroller 225 could disable the discharge FET 130 entirely. It would remain this way until the user releases the trigger and thus de-powers the entire system. Pulling the trigger again would re-start the stall processing. Although multiple trigger pulls to prolong a stall event would eventually fail motor windings, semiconductors devices in the pack or tool or other thermally stressed components in the cordless tool system, at least the user must intentionally re-activate the fault condition.

Referring again to FIGS. 5A and 513, a user operating along "Line 1" in FIG. 5A would hear the motor 190 slow periodically, but the software in the microcontroller 225 would not increment the stall counter. Operation on "Line 2" with brief excursions into Region C but quick returns back to Region A is described next. The software in the microcontroller 225 would briefly increment the stall counter, but it would be reset as soon as Region A was re-entered. Operation on "Line 3" would be difficult to hold, as the tool is drastically changing speed. Eventually, enough time would be spent in Region C that the stall counter would reach its limit and the system would shut down. The user operating on "Line 4" would shutdown quickly and their tool would be saved the needless waste of energy of Region C operation.

The stall detection methodology may allow users to push the tool to maximum power output and slightly over without unnecessary shut-downs. However, when stalled and held in that fault condition, software in microcontroller 225 will limit the length of time of the stall by shutting down the tool 170, so as to prevent damage to system components. This may enhance reliability by allowing heat to dissipate during switch re-triggers.

Pulsing the Tool Motor at Stall Conditions

When a stall condition, e.g., locked rotor condition is detected through the previously described mechanism, it may be desirable to pulse the tool motor 190. In an example, battery pack 100 may be configured to pulse the tool motor 190 to provide an impact function to the normal locked rotor condition (e.g., stall condition). By pulsing the tool motor 190 and using the backlash of the gears at a detected stall condition, the motor 190 can accelerate before the gears mesh. Because of this, the energy delivered to the output shaft of the power tool 170 is a combination of motor torque and kinetic energy of the inertial mass of the rotating motor 190.

When using a drill/driver, the drill/driver may become overloaded and stall. At this condition, all electrical energy is converter to motor torque. If more torque is required to rotate the accessory (e.g., drill bit) than the tool motor 190 can provide, the energy is wasted as heat and no work gets done. If, during this stall condition, the motor 190 is pulsed, the torque on the output shaft can be greater than it was at stall. By allowing the motor 190 and gear train to "relax" from the stall condition by turning off current to the motor (via FET 130), the motor back-spins due to the small elasticity of the gear train, housing, operator grip, and accessory. This back-spin rotates the motor 190 in the opposite direction until all the available backlash in the gear train is taken up. The backlash of a gear train can be understood as the play between moveable parts. Once the gear train is fully back-spun, the motor current is turned back on and the motor 190 accelerates forward.

Because of the play in the gear train, the motor 190 accelerates with the output shaft still stationary. At some point, all of the play in the gear train is used up and the motor 190 and gears are meshed together tightly. Now, motor torque is transferred to the tool output shaft, which is held stationary by the original stall condition. As the motor 190 applies its full stall torque as before, there is additional torque applied due the deceleration of the motor 190. The faster the motor deceleration, the higher the torque on the output shaft. When the motor 190's kinetic energy has run out, the torque on the output shaft drops back to its original stall value. If the motor current is turned off again, the process can be repeated.

By timing the On and Off times of the discharge FET 130 correctly, a resonance can be created by microcontroller 225 (battery electronic control unit 125) to maximize the impact energy delivered to the output shaft. The peak torque is only limited by the elasticity of the system or "hardness" of the stall. A hard joint may be defined as a sudden load which causes a stall condition and is characterized by very little system elasticity. This type of stall causes the most rapid deceleration of the motor and thus, the highest torque on the output. These motor pulses may be able to provide the breakthrough torque needed to free a stuck bolt or screw. In another example, being able to pulse the motor at a stall condition may also provide the driving energy to sink a large bolt flush with the working surface when the normal stall torque would not be sufficient.

In addition to added motor torque, there may be additional advantages to pulsing the motor at stall conditions. Users typically stall the motor and then use this stall torque in addition to their arm strength to finish the driving task. By pulsing the tool motor, the energy consumed is lower and therefore the user can accomplish more with the same battery pack. Pulsing the motor converts electrical energy to heat and kinetic energy; conversely stalling the motor only produces heat. The pulses may be intermittent, so energy lost as heat only happens periodically (per pulse) rather than continuously as a steady heat loss. This may lower tool system temperature and improve efficiency.

A further benefit to pulsing the motor is to protect the user from being kicked back under motor stall torque. It is similar to using an impact driver; it does not twist your arm under continuous torque. A pulse or ratchet mode is described in further detail in commonly assigned U.S. Pat. No. 5,731,673 to Alan A. Gilmore, entitled "ELECTRICAL POWER TOOL HAVING A MOTOR CONTROL CIRCUIT FOR INCREASING THE EFFECTIVE TORQUE OUTPUT OF THE POWER TOOL", the relevant portions describing pulsing or ratcheting modes for a tool motor incorporated by reference herein.

Figure 8:
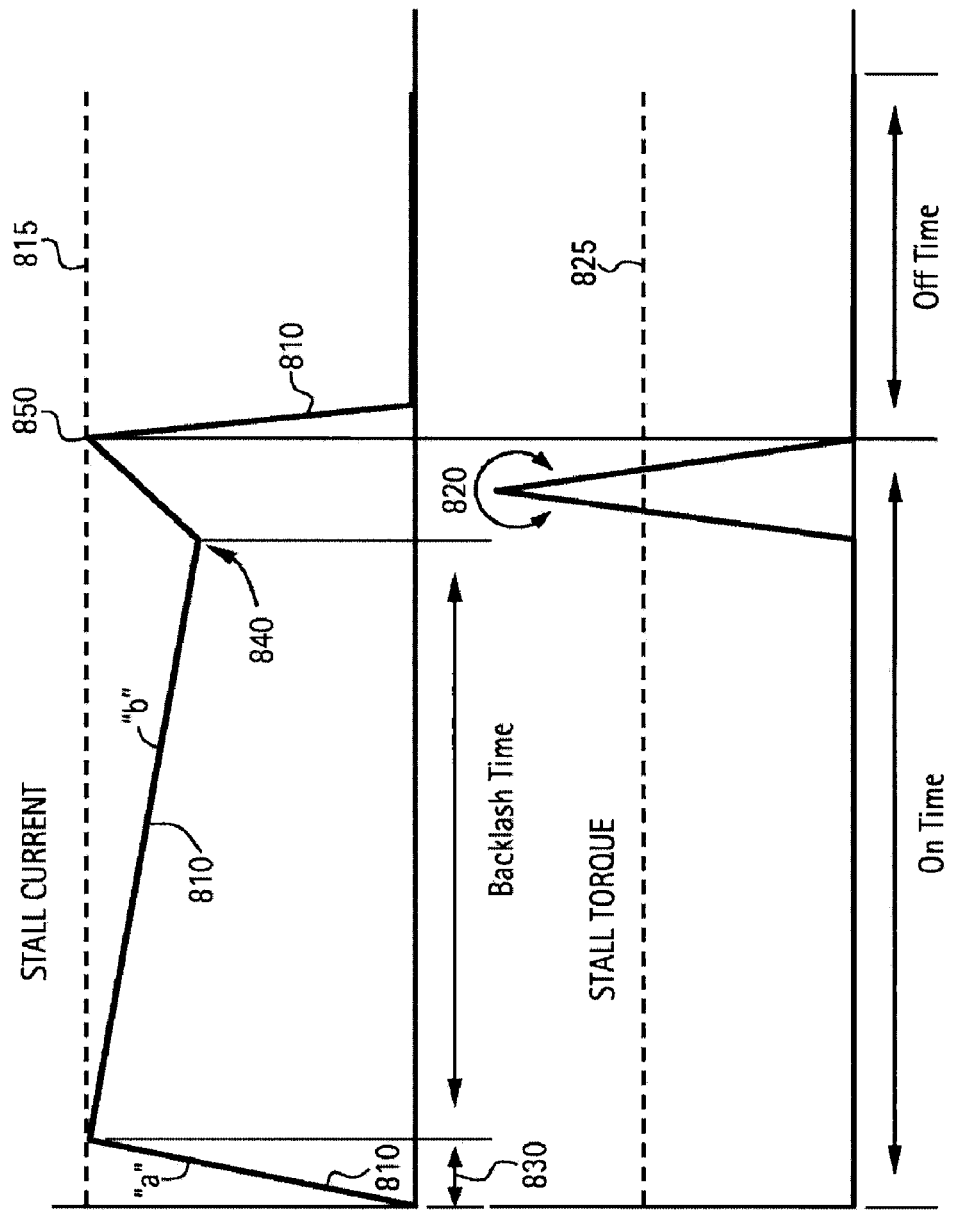
FIG. 8 is a graph of current and torque versus time to explain how the current sensor may be used for pulse mode/ratchet mode control of a tool motor when the tool is at a detected stall condition/locked rotor condition.

FIG. 8 is a graph of current and torque versus time to explain how the current sensor may be used for pulse mode/ratchet mode control of a tool motor when the tool is at a detected stall condition/locked rotor condition. Achieving resonance in the power tool system is desirable when pulsing the tool motor at stall. Resonance may be understood as timing of motor activation and relaxation in such a manner as to maximize backlash with the gear play and system elasticity to create the highest output torque pulse.

The current sensor 145 is useful for determining resonance. By monitoring the current through the system, a resonance can be achieved. By resonance, we are referring to delivering the maximum amount of kinetic energy while using the least amount of electrical power (on-time). Additionally, the design must also minimize the relaxation time (off-time) in order to maximize the number of pulses per second. In FIG. 8, the current and torque are plotted as a function of time, with motor current denoted by curve 810 with a horizontal line 815 denoting what stall current would be. Output torque is denoted by curve 820 with a horizontal line 825 denoting steady state stall torque.

During the initial current pulse, there is a delay (shown at 830) before a maximum current is achieved. The slope "a" of this motor current curve is proportional to the inductance of the system, i.e. the speed at which the current can ramp up to maximum with a given source voltage from the cells of pack 100, and system resistance is determined by the system inductance. The next section of time (at which stall is detected), is illustrated as "backlash time" and represents the motor acceleration. The motor 190 is beginning to turn and yet no torque exists on the shaft output due to the play in the gears.

As back EMF builds because the motor 190 is now spinning, the current in curve 810 is reduced. The slope "b" of this part of the line is determined by the motor acceleration. The motor acceleration is affected by the inertial mass of the motor and transmission, the battery voltage and impedance, and impedance of the motor. The time that part "b" of the motor current curve is sloping downward represents the amount of backlash that was available when the current was first turned on. When the current profile begins to climb (at point 840 in FIG. 8), that indicates that the gears are now fully meshed. From this point on, the motor is directly coupled to the output and hence, the torque on the output rises rapidly, as shown by curve 820. Current will continue to rise until the normal stall current is reached, designated by 850. The slope of this line is proportional to the deceleration of the motor 190.

Since the output is stopped, the motor is spinning, and the gears have just meshed, the kinetic energy of the rotating motor is transferred across the gear train to the component being driven as a torque spike. The rate at which the motor decelerates is proportional to the inertial mass of the motor and gears and the hardness of the joint. A cordless power tool system in which any or all of the components absorbs the impact energy is known as a "soft joint". In other words, the impact energy is absorbed in the elasticity of the gears, operator's body, accessory, and component being driven. The absorption is in the form of displacement, compression, elongation, heat dissipation and other forms of energy conversion. If the users arm "gives" and allows the tool to rotate in the opposite direction, the torque delivered to the workpiece would be reduced. In the opposite case, if all of the components in the system were infinitely stiff and the operator held the tool in a fixed position, the impact energy would be near infinite as the motor would have to decelerate extremely fast.

Realistically, the operator's arm may be one of the primary factors in the hardness of the joint and cannot create infinite forces. For the case of cordless power tools, the operator's grip can create at least a two times improvement over normal stall torque. The maximum torque in figure one occurs near the end of the current ramp. At this point, the current can be turned off and the gears allowed to relax. Any further motor current produces normal stall (as shown by dashed line). By allowing the gears to relax and firing again at the appropriate time, the maximum time for motor acceleration can be used.

The microcontroller 225 can vary the off times of FET 130 to maximize the time the motor 190 is accelerating. It is also possible to measure motor current during the off time and look for the current to fall to zero. Once the motor current falls to zero, this indicates that there is no more rotational velocity in the motor 190. The back EMF of the motor 190 will also tell the pack microcontroller 225 when the motor 190 has stopped turning. Additionally, microcontroller 225 can be configured to analyze the individual commutations to determine speed, position, and direction of the motor. Commutations could be detected by monitoring spikes in the current and/or back EMF, for example.

Alternatively to determine stall conditions, current, back EMF, etc., tachometric sensors can be used. In addition, the trigger 181 in FIG. 1B can be used as a conditional setting to not pulse unless the trigger 181 is fully depressed in a variable speed unit. The trigger 181 can also provide a variable impact by varying the acceleration of the motor during the On time.

The grip that the user has on the tool 170 may also serve as a prerequisite or trigger for entering a pulse mode. If the operator's grip were loose, then pulsing the motor would not produce high torque levels due to the user being the "soft" joint in the system. In other words, the operator's hand will absorb the impact of the gears and not the material being drilled or driven. Using inputs from capacitive, resistive, and/ or stain gauge sensors, the microcontroller 225 in the battery pack 100 can determine whether or not pulse mode should be initiated.

Figure 6:
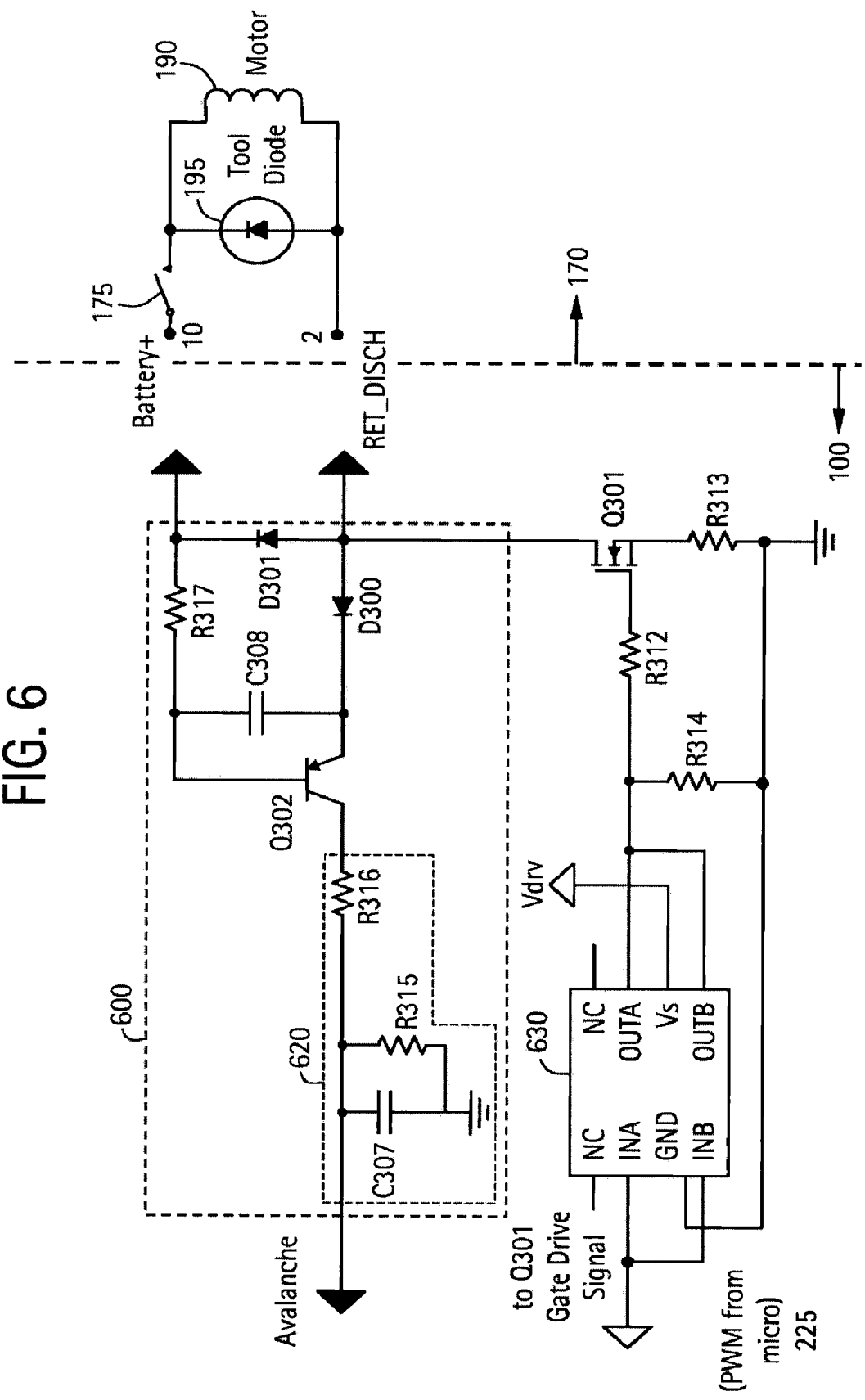
FIG. 6 illustrates an open diode detection and recovery circuit for connection between the power terminals in the battery pack so as to protect the discharge FET 130 in the battery pack 100.

FIG. 6 illustrates an open diode detection and recovery circuit for connection between the power terminals in the battery pack so as to protect the discharge FET 130 in the battery pack 100. The battery pack 100 of FIGS. 1A and 1B may be configured to detect a condition where a freewheeling diode, such as recirculating diode 195 in the tool 170 is disconnected or has failed open, so as to provide secondary protection within the battery pack 100 against such failure. This secondary protection in pack 100 is provided by employing a secondary freewheeling diode in the pack 100 with a higher forward voltage in combination with a detection circuit in the battery pack 100 that senses the increased forward drop and disable the tool motor 190.

FIG. 6 illustrates a schematic of a circuit that maybe configured within pack 100 between terminals 2 and 10 of the battery pack 100 shown in FIGS. 1A and 1B. The circuit 600 protects against an open free-wheeling diode such as recirculating power diode 195 within the tool 170 (failed or disconnected.) As shown in FIG. 6, a secondary diode D301 within the pack 100 becomes the freewheeling diode if the power diode 195 within the tool 170 fails open. Because D301 is a standard diode, the forward voltage drop is much higher than the tool diode 195. Current will only recirculate through D301 when there are problems within the tool 170.

The schematic in FIG. 6. shows a driver circuit 630 which converts the PWM output of microcontroller 225 to a drive signal suitable for MOSFET Q301. Driver circuit 630 corresponds to the driver circuit 140 and FET Q301 corresponds to discharge FET 130 in FIGS. 1A and 1B. The drive voltage is supplied by the designator Vdrv and is somewhat higher than the voltage supplying the microcontroller 225. Resistor R312 acts as a current limiter for charging the gate of discharge FET Q301 and prevents needless spikes on the power supply lines. Resistor R314 ensures that when power is removed from the circuit (tool trigger released) the gate of FET Q301 is pulled low and turned off. Resistor R313 is the shunt resistor and the voltage across it is representative of the current through the tool motor 190. R313 corresponds to current sensor 145 in FIGS. 1A and 1B.

Referring to FIG. 6, in operation, a FET (Q301) is off and the Battery+ and RET DISCH pins (terminals 10 and 2 in FIG. 1A) are at the same potential. Only leakage current flows though resistors R316 and R315. The leakage is small and produces only a few millivolts across the resistors. During 'discharge' FET Q301 turn-on, the battery current flows through the motor 190 and FET Q301 back to the battery pack 100. When FET Q301 turns off, the current in the motor 190 is allowed to recirculate through the tool diode 195. The small inductance within the battery pack 100 cannot be recirculated and it produces a very short voltage spike across the FET Q301. This does not affect the circuit and adds a small amount of heat to the system.

If the diode 195 across the motor 190 fails open or becomes disconnected, the current must recirculate across Diode D301. This produces a forward voltage drop on RET DISCH (terminal or pin 2 in FIG. 1A) with respect to Battery+(terminal or pin 10), which may be on the order of 1.5 to 2 volts (depending on diode current.) Some of this voltage is dropped by diode D300 in detection circuit 600. That helps keep FET 0301 off until a substantial voltage (e.g., greater than one volt) is seen across diode D301 and also keeps Q302 base-emitter junction from reverse breakdown when FET Q301 turns on. Capacitor C308 charges through R317 and eventually, another transistor in the detection circuit 600, Q302, turns on. The battery voltage flows through a resistor divider and capacitor circuit 620 to trip an input on the microcontroller 225, this is shown as an 'Avalanche' input. An Avalanche pin on the microcontroller 225 is an input that when pulled high, causes the software in microcontroller 225 to interrupt its normal calculations and go directly to a shutdown mode where the discharge FET Q301 is turned off. The FET 0301 will remain off until power is removed and reapplied by releasing and actuating the tool trigger 181.

Poor connections and diodes failing to an open condition are rare, but if this occurs, the failed open diode would destroy FET Q301 (discharge FET 130) within a few moments of operation after the pack 100 has been connected to the power tool 170. Because a failed diode is hard to diagnose unless disconnected from the power tool system, a service center may not necessarily fail a "test pack" when inserted in the suspect tool to diagnose a faulty condition in the tool, which in this case is a failed diode. Additionally, users will not be able to use the "broken" tool 170 with other battery packs 100 until the failed diode is fixed or replaced.

Secondary Over-Voltage Protection

Figure 7:
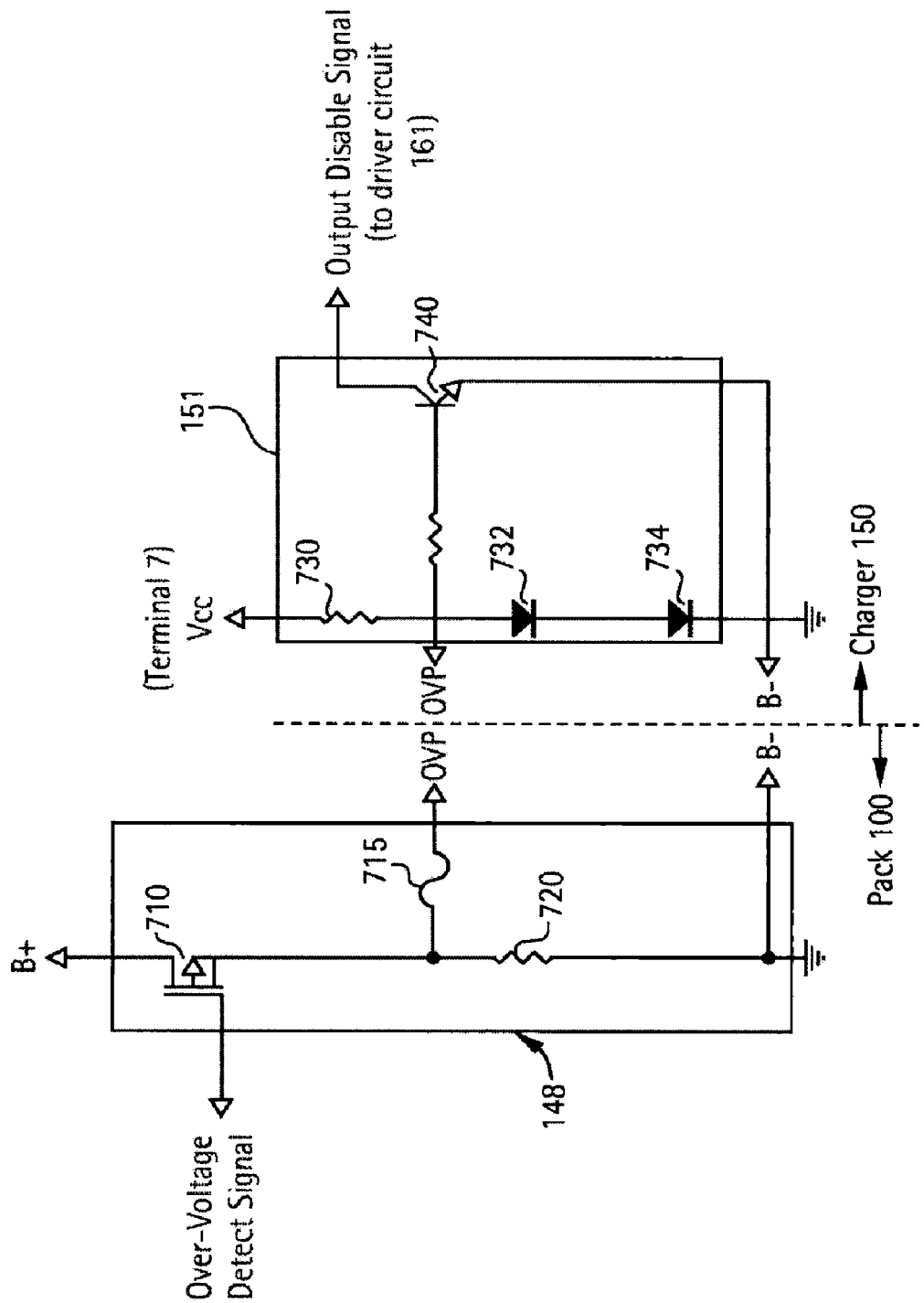
FIG. 7 is a secondary monitoring and over-voltage protection fuse protection circuit providing auxiliary protection for the battery pack 100 and/or its connected charger.

FIG. 7 is a secondary monitoring and over-voltage protection fuse circuit providing auxiliary protection for the battery pack and/or its connected charger. FIG. 7 illustrates part of the functionality of the secondary monitoring and overvoltage protection fuse circuit 148 (i.e., a second voltage monitoring circuit) shown generally in FIGS. 1A, 1B and 2 in conjunction with a disable circuit 151 in the charger power controller 160.

In FIG. 1A, one of the battery charger electronic control 125 (based on readings from voltage monitoring unit), and/or the charger electronic control circuit 155 can provide primary cell over-voltage protection during a charge. Circuit 148 is designed to separately monitor the voltage of each cell (in addition to voltage monitoring unit 115) to detect any cell (one or some or all cells) which reaches an over-voltage condition during charge. In such a case, the secondary monitoring and over-voltage protection fuse circuit 148 blows a fuse therein in the OVP line of FIG. 7. The pin at terminal 3 opens, and is detected by the disable circuit 151 in the charger 150 to generate a disable signal for terminating charge current in the charger 150. This will be explained in more detail with respect to FIG. 7.

As shown in FIG. 7, circuit 148 resides in pack 100, and includes a Pchannel MOSFET (PFET 710), fuse 715 and resistor 720 between the battery+ pin (B+ terminal) and ground. Although not shown, circuit 148 may include a plurality of stacked ASICs, each ASIC dedicated to measuring voltage of certain individuals cells 105. Disable circuit 151 resides in charger 150, and may be part of the power controller 160. Disable circuit 151 includes a resistor 730 and two or more diodes 732, 734 serially arranged between Vcc (see terminal 7 in FIG. 1A) and ground, and further includes an NPN transistor 740.

A serial path connected at OVP pin 3 in FIG. 1A is provided between circuits 148 and 151 to provide a second independent means to terminate charge current based on an over-voltage condition in any cell 105 at any time during charge. This second way of detecting an OV condition in a cell 105 is independent of any communications between microcontroller 125 and charger electronic control circuit 155. Note that the values of the various circuit components in FIG. 7 are merely exemplary, other component values for the resistors and fuse (which may be a 0.25 A fuse in one example) as shown in FIG. 7 may be employed.

In operation, during normal charging operations, the PFET 710 in the battery pack 100 is in an off state and the fuse 715 is intact. The resistor 720 in the battery pack 100 (which may be a 2.2 KΩ resistor, for example) keeps the NPN transistor 740 in the charger 150 in an off state, thus allowing the charger 150 to operate normally. When a cell over-voltage condition in a cell is detected by one of the ASICs in the secondary protection circuit 148 the PFET 710 in the battery pack 100 will turn on. When the PFET 710 turns on, current flows from B+ through the fuse 715 in the pack 100 through the two diodes 732, 734 in the charger 150 then to ground. This current flow will blow the fuse 715 and disconnect the resistor 720 in the battery pack 100 from the base of the NPN transistor 740 in the power controller 160 of the charger 150.

Accordingly, the disable circuit 151 sees OVP pin 3 open due to fuse 715 blowing open, and disables charger output. This is done independent of any communication between microcontroller 225 in the pack and charger electronic control 155 in FIG. 1A. With the resistor 720 out of the circuit, the resistor 730 (which may be a 100 KΩ resistor, for example) in the charger 150 will receive a Vcc (3-5 volts) from terminal 7, which flows through resistor 730 and saturates the NPN transistor 740 to turn on transistor 740 (which is a pull-down transistor.). This is the disable signal that is designed to terminate charge current. Based on receipt of the disable signal, the NPN transistor 740 outputs a low to pull down (turn off) the driver circuit 161 that powers charger FET 157, cycling charger FET 157 OFF and terminating charge current.

Optionally, the collector of the NPN transistor 740 may be tied to a NFET in the low-side current path. The over-voltage detect signal shown in FIG. 7 represents a control signal of the proper polarity to activate PFET 710. This signal is derived from the independent over-voltage detection circuit 148 of FIGS. 1A and 1B). Additionally, PFET 710 may be a P-type or N-type FET or a bi-polar transistor.

The circuit in FIG. 7 is designed to interrupt charge even if the fuse 715 fails to open due to weak PFET 710. Also, any poor or improper connection will interrupt charge, and the circuit is testable: a functional tester will not activate the fuse 715.

The example embodiments being thus described, it will be obvious that the same may be varied in many ways. Such variations are not to be regarded as departure from the example embodiments, and all such modifications as would be obvious to one skilled in the art are intended to be included within the scope of the appended claims herein.

What is claimed is:

1. An electronics module of a battery pack for powering a cordless power tool, the pack including a plurality of lithium-ion battery cells therein, the module comprising:

an integrated circuit which includes a first voltage monitoring unit for monitoring individual lithium-ion cell voltages and total stack voltage of the lithium cells during charge and discharge operations;

a microcontroller external to and in connection with the integrated circuit;

a discharge FET for controlling one of current and power output from the battery pack to control a motor of the tool, wherein the microcontroller selectively controls the discharge FET so as to control current to the tool motor;

a second voltage monitoring circuit distinct from the first voltage monitoring unit that monitors individual cell voltages and, without interfacing with the battery electronic control unit, generates a disable signal in a charge operably coupled to the battery pack when any cell reaches an over-voltage condition during a charging operation; and a fuse in a charge return line to the module.

2. The claim module of claim 1 wherein the microcontroller provides pulse width modulation (PWM) control of the discharge FET so as to control tool motor current, and the integrated circuit includes current limit processing circuitry for evaluating pack current during each switching period of the discharge FET and potentially limiting power out of the pack based on the evaluation.

3. The module of claim 1, wherein the current limit processing circuitry sets a reference voltage level representative of a current limit for the pack, and during each switching period of the discharge FET, compares a shunt voltage representing measured instantaneous pack current to the reference voltage level, and
if shunt voltage qual or exceeds the reference voltage level in a given switching period, the current limiting processing circuitry generates an output signal to the microcontroller to turn off the discharge FET for the remainder of the switching period to reduce power out of the pack.

4. The module of claim 1, wherein
the microcontroller provides pulse width modulation (PWM) control of the discharge FET so as to control motor current, and
the integrated circuit further includes average current limit processing circuitry for feeding back average current information to the microcontroller so as to PWM control the discharge FET.

5. The module of claim 1 wherein the second voltage monitoring circuit includes a fuse in a serial data path connecting the second voltage monitoring circuit to a disable circuit in the charger, wherein the fuse creates an open circuit in the data path when any cell reaches an over-voltage condition during a charging operation.

6. The module of claim 1 wherein the disable circuit includes a transistor having a control terminal connected to the data path and operable to generate the disable signal when the data path having an open circuit.

7. A secondary circuit for providing over-voltage protection for battery cells in a battery pack, the battery pack having a first voltage monitoring circuit that monitors individual cell voltages of battery cells residing in the battery pack, the secondary circuit comprising:
a secondary voltage monitoring circuit in the battery pack, distinct from the first voltage monitoring circuit, that monitors individual cell voltages and sends a disable signal to a battery charger operably coupled to the battery pack upon detecting any cell reaching an over-voltage condition; and
a second circuit in the battery charger configured to receive the disable signal and interrupt charge current from the charger in response to the disable signal.

8. The secondary circuit of claim 7 further comprises a fuse in a serial data path connecting the second voltage monitoring circuit to a disable circuit in the charger, wherein the fuse creates an open circuit in the data path when any cell reaches an over-voltage condition during a charging operation.

9. The secondary circuit of claim 8 wherein the disable circuit includes a transistor having a control terminal connected to the data path and operable to generate the disable signal when the data path having an open circuit.

10. The secondary circuit of claim 7 wherein the first voltage monitoring circuit resides in one of the battery pack or the battery charger.

11. A cordless power tool system having a battery pack that operably couples to a battery charger, the system includes a first voltage monitoring unit that monitors individual cell voltages of battery cells residing in the battery pack and a charge control unit that controls delivery of a charge current to the battery pack during charging, the battery pack comprising:
a housing;
a plurality of battery cells within the housing; and
a secondary voltage monitoring circuit separate from the first monitoring unit that monitors the plurality of battery cells individually to detect when any cell reaches an over-voltage condition and provides a disable signal to the battery charger upon detecting a battery cell having an over-voltage condition, wherein the battery charger interrupts the charge current in response to receiving the disable signal.

12. The power tool system of claim 1, wherein the first voltage monitoring unit provides a signal representing a measured individual cell voltage to the charge control unit during charging, and the charge control unit controls balancing of cell voltages during a charge based on signals received from the first voltage monitoring unit.

13. The power tool system of claim 11, further comprising:
a fuse in a charge return line within the battery pack acting as additional protection in a case where the charge control unit becomes inoperative and current exceeds normal levels during charging.

14. The power tool system of claim 11 wherein the charge control unit resides in the battery pack.

15. The power tool system of claim 11 wherein the charge control unit resides in the battery charger.

16. The secondary circuit of claim 11 wherein the first voltage monitoring circuit resides in one of the battery pack or the battery charger.

17. The power tool system of claim 11 wherein the second voltage monitoring circuit includes a fuse in a serial data path connecting the second voltage monitoring circuit to a disable circuit in the charger, wherein the fuse creates an open circuit in the data path when any cell reaches an over-voltage condition during a charging operation.

18. The power tool system of claim 17 wherein the disable circuit includes a transistor having a control terminal connected to the data path and operable to generate the disable signal when the data path having an open circuit.

* * * * *

UNITED STATES PATENT AND TRADEMARK OFFICE
CERTIFICATE OF CORRECTION

PATENT NO.       : 7,928,692 B2
APPLICATION NO.  : 12/775512
DATED            : April 19, 2011
INVENTOR(S)      : David A. Carrier et al.

It is certified that error appears in the above-identified patent and that said Letters Patent is hereby corrected as shown below:

On the Title Page, (57) ABSTRACT,
Line 7, "they" should be -- the --.

Column 3,
Between lines 7 and 8, insert the following as a new paragraph:
-- FIG. 4 is a circuit for providing FET under-voltage detection for the voltage which drives the discharge FET in the battery pack. --.

Column 20,
Line 56, delete "claim" (first occurrence in patent).

Column 21,
Line 3, "qual" should be -- equals --.

Signed and Sealed this
Twelfth Day of July, 2011

David J. Kappos
*Director of the United States Patent and Trademark Office*